United States Patent
Iwai et al.

(10) Patent No.: US 12,436,878 B2
(45) Date of Patent: *Oct. 7, 2025

(54) NONVOLATILE MEMORY, MEMORY SYSTEM, AND CONTROL METHOD OF NONVOLATILE MEMORY WITH COMMAND PROCESSING UNIT

(71) Applicant: Kioxia Corporation, Tokyo (JP)

(72) Inventors: Daisuke Iwai, Yokohama Kanagawa (JP); Toshio Fujisawa, Yokohama Kanagawa (JP); Keigo Hara, Kamakura Kanagawa (JP)

(73) Assignee: Kioxia Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/502,498

(22) Filed: Nov. 6, 2023

(65) Prior Publication Data

US 2024/0070062 A1   Feb. 29, 2024

Related U.S. Application Data

(63) Continuation of application No. 17/184,313, filed on Feb. 24, 2021, now Pat. No. 11,847,050.

(30) Foreign Application Priority Data

Sep. 3, 2020   (JP) ................................. 2020-148337

(51) Int. Cl.
   *G06F 12/02*   (2006.01)
(52) U.S. Cl.
   CPC ...... *G06F 12/0246* (2013.01); *G06F 12/0238* (2013.01); *G06F 2212/202* (2013.01); *G06F 2212/403* (2013.01); *G06F 2212/7205* (2013.01)

(58) Field of Classification Search
   CPC ............ G06F 12/0246; G06F 12/0238; G06F 2212/202; G06F 2212/403;
   (Continued)

(56) References Cited

U.S. PATENT DOCUMENTS 6,574,757 B1 * 6/2003 Park ...................... G11C 29/44
                                                          714/710
8,930,614 B2    1/2015 Masuo
   (Continued)

FOREIGN PATENT DOCUMENTS

JP     2013137665 A    7/2013
TW      201917579 A    5/2019
   (Continued)

OTHER PUBLICATIONS

PCMag Definition of a Bus, 2022, 4 pages.
   (Continued)

*Primary Examiner* — Tasnima Matin
(74) *Attorney, Agent, or Firm* — Kim & Stewart LLP

(57) ABSTRACT

According to one embodiment, a nonvolatile memory includes a memory chip and a command processing unit. The command processing unit stores data read from a first position of the memory chip in a memory when a first command for compaction is received from a controller, transmits validity determination information used for determining whether or not the data read from the first position is valid to the controller, and writes valid data of the data stored in the memory to a second position of the memory chip when a second command for the compaction and validity identification information that identifies the valid data are received from the controller.

18 Claims, 17 Drawing Sheets

(58) Field of Classification Search
CPC ..... G06F 2212/7205; G06F 2212/7209; G11C 16/10; G11C 16/16; G11C 16/26
See application file for complete search history.

(56) References Cited

U.S. PATENT DOCUMENTS

| | | | |
|---|---|---|---|
| 10,102,119 | B2 | 10/2018 | Gopinath |
| 2006/0053246 | A1 | 3/2006 | Lee |
| 2011/0035645 | A1 | 2/2011 | Yang |
| 2011/0041005 | A1 | 2/2011 | Selinger |
| 2014/0032868 | A1* | 1/2014 | Nagai ............... G06F 12/14 711/164 |
| 2014/0215129 | A1* | 7/2014 | Kuzmin ............ G06F 12/0246 711/103 |
| 2015/0261456 | A1 | 9/2015 | Alcantara |
| 2015/0261797 | A1 | 9/2015 | Alcantara |
| 2017/0262212 | A1 | 9/2017 | Nakanishi |
| 2018/0276073 | A1 | 9/2018 | Ide |
| 2019/0129838 | A1 | 5/2019 | Yoshida |
| 2019/0172537 | A1 | 6/2019 | Peddle |
| 2019/0220396 | A1 | 7/2019 | Lin |
| 2019/0273090 | A1 | 9/2019 | Fukuzumi |
| 2020/0050399 | A1 | 2/2020 | Yeh |
| 2020/0125488 | A1 | 4/2020 | Byun |
| 2021/0326490 | A1 | 10/2021 | Zalivaka |
| 2022/0066921 | A1 | 3/2022 | Iwai |

FOREIGN PATENT DOCUMENTS

| | | |
|---|---|---|
| TW | 201933101 A | 8/2019 |
| TW | 202009711 A | 3/2020 |

OTHER PUBLICATIONS

Pranit Jadhav et al., "ADuCM4050 Flash EEPROM Emulation", Analog Devices, AN-1471, Application Note, 2018, pp. 1-10.

Jaewon Cha et al., "Data Randomization Scheme for Endurance Enhancement and Interference Mitigation of Multilevel Flash Memory Devices", ETRI Journal, vol. 35, No. 1, Feb. 2013, pp. 166-169.

Sangwhan Moon et al., "Write Amplification due to ECC on Flash Memory or Leave those Bit Errors Alone", IEEE Xplore, 2012, 6 pages.

* cited by examiner

NONVOLATILE MEMORY, MEMORY SYSTEM, AND CONTROL METHOD OF NONVOLATILE MEMORY WITH COMMAND PROCESSING UNIT

CROSS-REFERENCE TO RELATED APPLICATIONS

This application is a continuation of U.S. patent application Ser. No. 17/184,313, filed Feb. 24, 2021, which is based upon and claims the benefit of priority from Japanese Patent Application No. 2020-148337, filed Sep. 3, 2020, the entire contents of each of which are incorporated herein by reference.

FIELD

Embodiments described herein relate generally to a nonvolatile memory, a memory system, and a control method of a nonvolatile memory.

BACKGROUND

A solid-state drive (SSD) is an example of a memory system. The SSD includes a nonvolatile memory such as a NAND flash memory. The nonvolatile memory includes a plurality of blocks. Data is typically erased on a block unit basis. An SSD can collect a valid data stored across a plurality of different blocks of the nonvolatile memory in a fragmentary state, and then perform a compaction process to consolidate valid data into fewer blocks by writing the fragmentary data back to the nonvolatile memory. The compaction process thus organizes blocks of the nonvolatile memory to leave fewer blocks storing less than a full block of data.

DETAILED DESCRIPTION

Embodiments provide a nonvolatile memory, a memory system, and a compaction method capable of performing compaction at high speed.

In general, according to one embodiment, a nonvolatile memory includes a memory chip and a command processing unit. The command processing unit controls writing and reading of data to and from the memory chip according to a command received from a controller. The command processing unit is configured to store the data read from a first position of the memory chip in a memory when a first command for compaction to the memory chip is received from the controller, transmit validity determination information that can be used for determining whether or not the data read from the first position is valid to the controller, and write valid data of the data stored in the memory to a second position of the memory chip when a second command for the compaction to the memory chip and validity identification information that identifies the valid data stored in the memory are received from the controller.

The present embodiments will be described below with reference to the drawings. In the following description, those functions and elements that are substantially the same as one another are denoted using the same reference signs, and duplicate descriptions will be given only when necessary. Furthermore, in general, the numerical values and the number of elements described in the present embodiment are examples and may be changed as appropriate.

In an embodiment, the nonvolatile memory includes a command processing unit and a memory cell array. The command processing unit performs compaction according to a command received from the controller. In the present disclosure, compaction may be referred to as garbage collection in some instances.

Figure 1:
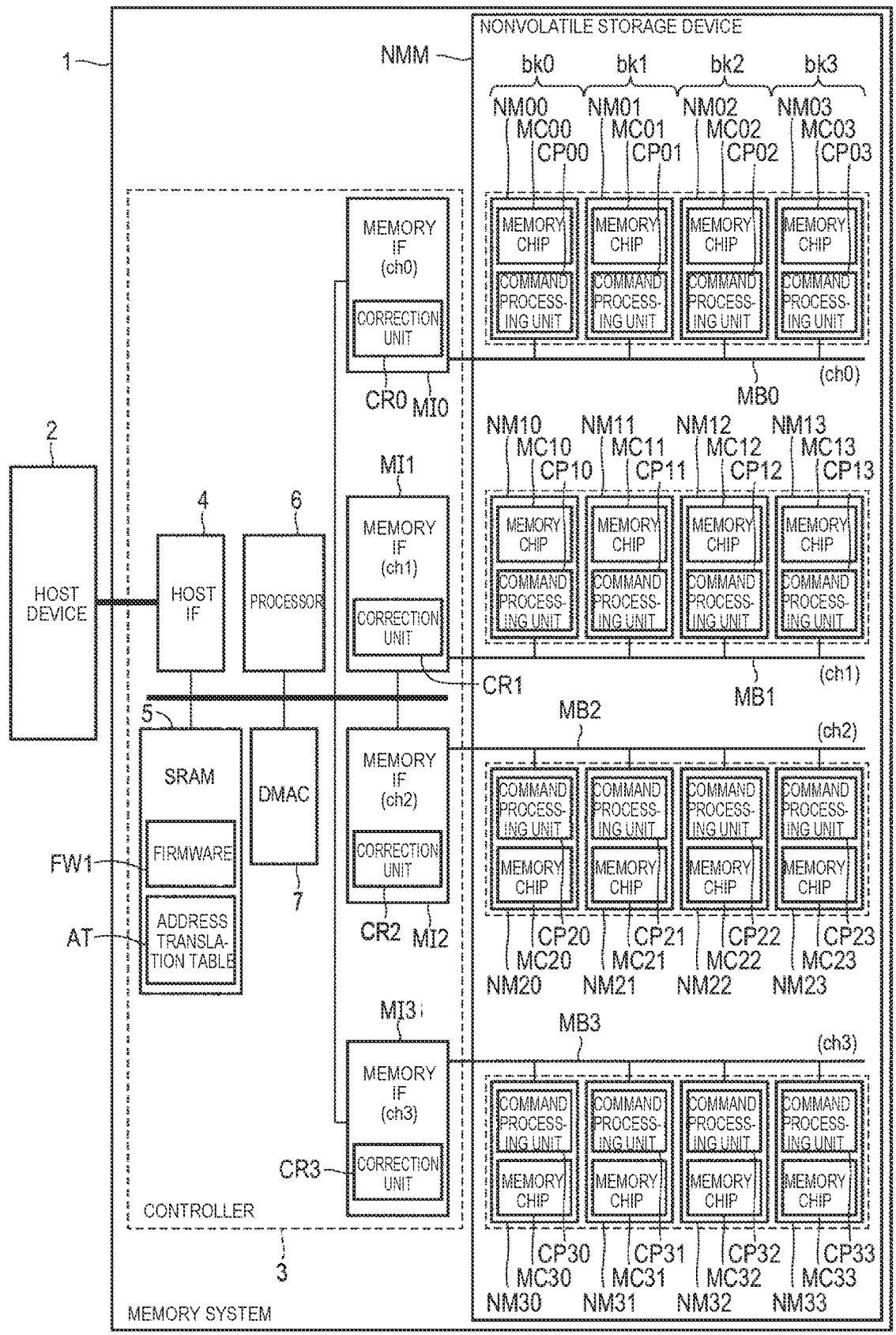
FIG. 1 is a block diagram showing an example of a configuration of a memory system including nonvolatile memories according to an embodiment.

FIG. 1 is a block diagram showing an example of a configuration of a memory system 1 including nonvolatile memories NM00 to NM33 according to the present embodiment.

The memory system 1 is, for example, an SSD. The memory system 1 may be any of various types of storage devices such as a hard disk drive (HDD), a universal serial bus (USB) memory, a memory card, a hybrid storage system including a hard disk drive and an SSD, and an optical disk device. The memory system 1 can communicate with a host device 2 (for example, an external information processing device).

The memory system 1 includes a nonvolatile storage device NMM and a controller 3.

The nonvolatile storage device NMM includes the nonvolatile memories NM00 to NM33.

The controller 3 controls the writing of data to the nonvolatile storage device NMM and controls the reading of data from the nonvolatile storage device NMM. More specifically, the controller 3 performs control for the nonvolatile memories NM00 to NM33 according to a command received from the host device 2.

The controller 3 includes a host interface unit 4, a storage device such as a static random access memory (SRAM) 5, a processor 6, a direct memory access controller (DMAC) 7, and memory interface units MI0 to MI3. The host interface unit 4, the SRAM 5, the processor 6, the DMAC 7, and the memory interface units MI0 to MI3 of the controller 3 can transmit or receive data, information, signals, commands, requests, messages, instructions, and responses to and from each other via a bus.

First, the nonvolatile memories NM00 to NM33 and their elements will be described.

It is assumed that each of the nonvolatile memories NM00 to NM33 is a nonvolatile semiconductor memory having a three-dimensional structure. However, the nonvolatile memories NM00 to NM33 may be other types of memories that also need to perform compaction.

Specifically, the nonvolatile memories NM00 to NM33 may be, for example, NAND flash memories. The nonvolatile memories NM00 to NM33 may instead be any of nonvolatile semiconductor memories such as a NOR flash memory, a magnetoresistive random access memory (MRAM), a phase-change random access memory (PRAM), a resistive random access memory (ReRAM), and a ferroelectric random access memory (FeRAM).

The nonvolatile memories NM00 to NM33 are grouped into banks bk0 to bk3, and further grouped into channels ch0 to ch3. The bank bk0 corresponds to the nonvolatile memories NM00, NM10, NM20, and NM30. The bank bk1 corresponds to the nonvolatile memories NM01, NM11, NM21, and NM31. The bank bk2 corresponds to the nonvolatile memories NM02, NM12, NM22, and NM32. The bank bk3 corresponds to the nonvolatile memories NM03, NM13, NM23, and NM33.

Each of the nonvolatile memories NM00 to NM03 is connected to a memory bus MB0. The nonvolatile memories NM00 to NM03 correspond to the channel ch0.

The nonvolatile memory NM00 includes a command processing unit CP00 and a memory chip MC00, which may be an array chip. The memory chip MC00 is an example of a memory device. The nonvolatile memory NM01 includes a command processing unit CP01 and a memory chip MC01. The nonvolatile memory NM02 includes a command processing unit CP02 and a memory chip MC02. The nonvolatile memory NM03 includes a command processing unit CP03 and a memory chip MC03.

A memory cell array is formed in each of the memory chips MC00 to MC03. Each of the memory chips MC00 to MC03 may be, for example, a NAND flash memory die. Storing data in the memory cells of the memory chips MC00 to MC03 in a nonvolatile state may be described as "programming" or "writing" in some instances.

The command processing unit CP00 is an example of a control unit that controls the memory chip MC00. The command processing unit CP00 is formed of, for example, complementary metal oxide semiconductor (CMOS) device.

The command processing unit CP00 receives a command from the controller 3 via the memory bus MB0, and performs control for the memory chip MC00 according to the command.

The command processing unit CP00 assists compaction of the memory chip MC00 in cooperation with the controller 3.

Specifically, in the present example, the command processing unit CP00 receives a write command, a physical address of a write destination, and write data from the controller 3, and then writes the write data to the position specified by the physical address in the memory chip MC00. The command processing unit CP00 can receive a read command and a physical address of a read destination from the controller 3, then read the read data from the position specified by the physical address in the memory chip MC00, and transmit the read data to the controller 3.

Similarly, each of the command processing units CP01 to CP03 receives a command from the controller 3 via the memory bus MB0, and respectively performs control for each of the memory chips MC01 to MC03 according to the received command.

Each of the nonvolatile memories NM10 to NM13 is connected to a memory bus MB1. The nonvolatile memories NM10 to NM13 correspond to the channel ch1.

The nonvolatile memory NM10 includes a command processing unit CP10 and a memory chip MC10. The nonvolatile memory NM11 includes a command processing unit CP11 and a memory chip MC11. The nonvolatile memory NM12 includes a command processing unit CP12 and a memory chip MC12. The nonvolatile memory NM13 includes a command processing unit CP13 and a memory chip MC13.

Each of the command processing units CP10 to CP13 receives a command from the controller 3 via the memory bus MB1, and respectively performs control for each of the memory chips MC10 to MC13 according to the command.

Each of the nonvolatile memories NM20 to NM23 is connected to a memory bus MB2. The nonvolatile memories NM20 to NM23 correspond to the channel ch2.

The nonvolatile memory NM20 includes a command processing unit CP20 and a memory chip MC20. The nonvolatile memory NM21 includes a command processing unit CP21 and a memory chip MC21. The nonvolatile memory NM22 includes a command processing unit CP22 and a memory chip MC22. The nonvolatile memory NM23 includes a command processing unit CP23 and a memory chip MC23.

Each of the command processing units CP20 to CP23 receives a command from the controller 3 via the memory bus MB2, and respectively performs control for each of the memory chips MC20 to MC23 according to the command.

Each of the nonvolatile memories NM30 to NM33 is connected to a memory bus MB3. The nonvolatile memories NM30 to NM333 correspond to the channel ch3.

The nonvolatile memory NM30 includes a command processing unit CP30 and a memory chip MC30. The nonvolatile memory NM31 includes a command processing unit CP31 and a memory chip MC31. The nonvolatile memory NM32 includes a command processing unit CP32 and a memory chip MC32. The nonvolatile memory NM33 includes a command processing unit CP33 and a memory chip MC33.

Each of the command processing units CP30 to CP33 receives a command from the controller 3 via the memory bus MB3, and respectively performs control for each of the memory chips MC30 to MC33 according to the command.

In the following, in order to simplify the description, the nonvolatile memory NM00 will be described as representative of each of the nonvolatile memories NM00 to NM33.

Furthermore, in the following, in order to simplify the description, the description and explanation related specifically to the memory buses MB0 to MB3 will generally be omitted except when necessary to understanding of certain details.

In the present embodiment, the command processing unit CP00 performs an error correction process. In compaction, the command processing unit CP00 performs a process of extracting validity determination information used for determining whether or not the data is valid. The validity determination information is referred to as a "redundant part." After determining whether data is valid ("valid data"), the command processing unit CP00 performs a process of writing only the valid data to an erased block of the memory chip MC00.

In the present embodiment, it is assumed that the redundant part includes a logical address. The redundant part may be, for example, metadata of data corresponding to the redundant part. The metadata is, for example, various attribute information for the data.

Specifically, the command processing unit CP00 receives a compaction read command and the physical address of the read destination from the processor 6 via the memory interface unit MI0. Here, the compaction read command is a command for reading data from a block on which compaction is to be performed (hereinafter refer to as an "original block"). Upon receiving the compaction read command and the physical address of the read destination, the command processing unit CP00 reads the data from the position specified by the physical address in the memory chip MC00. The command processing unit CP00 then performs an error correction process on the read data.

When the data error correction is not possible, the command processing unit CP00 transmits the data and the redundant part to the processor 6 via the memory interface unit MI0. In this case, a correction unit CR0 of the memory interface unit MI0 performs an error correction process on the data and the redundant part. The processor 6 determines whether the data is valid or invalid based on the error-corrected data, the error-corrected redundant part, an address translation table AT, and the physical address of the read destination. Then, the processor 6 transmits a command for writing valid data (referred to as a write command) to a write destination block ("destination block") in the nonvolatile memories NM00 to NM33, a physical address of the write destination, the valid data, and a redundant part corresponding to the valid data to the command processing unit CP00 via the memory interface unit MI0.

The command processing unit CP00 receives the write command, the physical address of the write destination, the valid data, and the redundant part from the processor 6 via the memory interface unit MI0. Upon receiving the write command, the physical address of the write destination, the valid data, and the redundant part, the command processing unit CP00 writes the valid data and the redundant part to the position specified by the physical address of the write destination in any of the memory chips MC00 to MC33.

When the data error correction is possible on the data read in response to the compaction read command, the command processing unit CP00 transmits the redundant part added to the data (that is, the data read at the physical address accompanying the compaction read command) along with the logical address to the processor 6 via the memory interface unit MI0. The transmission of just the redundant part without the rest of the read data is referred to as "data-out of the redundant part" in this context. In this case, the command processing unit CP00 does not transmit the data to the processor 6 via the memory interface unit MI0. The processor 6 determines whether the data read in response to the compaction read command is valid or invalid based on the received redundant part, the address translation table AT, and the physical address of the read destination. Then, the processor 6 transmits a compaction write command (also referred to as a "compaction program command"), a physical address of the write destination, and a redundant part corresponding to the valid data to the command processing unit CP00 via the memory interface unit MI0. Here, the compaction write command is a command for writing valid data to the destination block.

The command processing unit CP00 receives the compaction write command, the physical address of the write destination, and the redundant part from the processor 6 via the memory interface unit MI0 (this is referred to as "data-in of the redundant part" in this context). Upon receiving the compaction write command, the physical address of the write destination, and the redundant part, the command processing unit CP00 writes the data corresponding the redundant part and the redundant part to the position specified by the write destination physical address in the memory chip MC00.

In the present embodiment, a process performed when the command processing unit CP00 receives the compaction write command from the processor 6 via the memory interface unit MI0 is referred to as a compaction write operation.

Upon receiving an erase command and a physical address of an erase destination corresponding to the original block from the processor 6 via the memory interface unit MI0, the command processing unit CP00 performs an erase on the position specified by the erase destination physical address in the memory chip MC00.

Next, the controller 3 and its elements will be described.

For example, in compaction, the controller 3 issues a compaction read command and a compaction write command to any of the nonvolatile memories NM00 to NM33.

The host interface unit 4 conforms to a predetermined standard (protocol). The host interface unit 4 receives data, information, signals, commands, requests, messages, instructions, responses, and the like from the host device 2. Further, the host interface unit 4 transmits data, information, signals, commands, requests, messages, instructions, responses, and the like to the host device 2.

The predetermined standard may be, for example, a nonvolatile memory Express (NVMe) standard, a peripheral component interconnect express (PCIe) standard, a serial advanced technology attachment (SATA) standard, or a serial attached small computer system interface (SAS) standard.

The SRAM 5 stores, for example, a firmware FW1 and the address translation table AT. Instead of the SRAM 5, another memory such as a dynamic random access memory (DRAM) may be used. Further, the controller 3 may include both the SRAM 5 and the DRAM.

The firmware FW1 is an example of software executed by processor 6. The firmware FW1 includes, for example, instruction code and data. The firmware FW1 is executed by the processor 6 to cause compaction to be performed by any of the command processing units CP00 to CP33 provided in the nonvolatile memories NM00 to NM33.

The address translation table AT associates the logical address and the physical address of the data stored in the nonvolatile memories NM00 to NM33. The address translation table AT may be paraphrased as a look-up table. The logical address may be, for example, logical block addressing (LBA). The physical address may be, for example, physical block addressing (PBA).

For example, according to an instruction of the processor 6, the DMAC 7 transfers the data stored in the memory provided in the host device 2 or the data stored in the memory provided in the memory system 1 to another memory.

The memory interface units MI0 to MI3 correspond to channels ch0 to ch3. A write operation (or a read operation) on the nonvolatile memories NM00 to NM03 by the memory interface unit MI0, a write operation (or a read operation) on the nonvolatile memories NM10 to NM13 by the memory interface unit MI1, a write operation (or a read operation) on the nonvolatile memories NM20 to NM23 by the memory interface unit MI2, and a write operation (or a read operation) on the nonvolatile memories NM30 to NM33 by the memory interface unit MI3 can be performed in parallel with each other. In other words, the controller 3 can perform write and read operations on the different channels (ch0 to ch3) in parallel with each other. The memory interface units MI0 to MI3 include correction units CR0 to CR3, respectively.

The correction units CR0 to CR3 perform an error detection process and an error correction process using, for example, an error correcting code (ECC) on the data received from the nonvolatile memories NM00 to NM03, NM10 to NM13, NM20 to NM23, and NM30 to NM33, respectively. The correction units CR0 to CR3 perform, for example, soft bit correction having a higher error correction capability than that of the command processing units CP00 to CP33.

The soft bit correction may be performed by the processor 6 instead of the correction units CR0 to CR3. The controller 3 may include a dedicated device or circuit for performing soft bit correction.

In the present embodiment, the soft bit correction means performing an error detection process and an error correction process using likelihood information such as a log-likelihood ratio (LLR) representing the certainty of 0 or 1. As an error correction code, for example, a low-density parity-check (LDPC) code is used. In the soft bit correction, for example, the LLR value is calculated using soft bit information obtained by soft bit reading by the memory interface units MI0 to MI3, and the calculated LLR value is used. The soft bit reading refers to reading data in the memory cell using, for example, a read voltage used in hard bit reading and two or more read voltages set in a predetermined step size in the magnitude direction with respect to the read voltage used in the hard bit reading. The soft bit information may be a combination of a plurality of data obtained by soft bit reading, or may be data obtained by logically operating the plurality of data.

The processor 6 performs various controls according to the firmware FW1.

The processor 6 is any one of various processing devices such as a central processing unit (CPU), a micro-processing unit (MPU), a digital signal processor (DSP), or a graphics processing unit (GPU).

For example, when the memory system 1 is started up, the processor 6 reads the firmware FW1 and the address translation table AT from at least one of the nonvolatile memories NM00 to NM33 via at least one of the memory interface units MI0 to MI3. Then, the processor 6 stores the firmware FW1 and the address translation table AT in the SRAM 5.

For example, when the memory system 1 is stopped, the processor 6 writes the address translation table AT stored in the SRAM 5 to at least one of the nonvolatile memories NM00 to NM33 via at least one of the memory interface units MI0 to MI3.

In the present embodiment, the processor 6 transmits a command for performing compaction (e.g., a compaction read command, a compaction move command, a compaction write command, or an erase command) to at least one of the command processing units CP00 to CP33 via at least one of the memory interface units MI0 to MI3. When the error correction by at least one of the command processing units CP00 to CP33 is not possible in the compaction, the processor 6 performs the compaction in place of at least one of the command processing units CP00 to CP33.

The operation of the processor 6 in the compaction according to the present embodiment will be more specifically described.

The processor 6 selects an original block on which compaction should be performed from the nonvolatile memories NM00 to NM33 based on the address translation table AT stored in the SRAM 5. Selection of an original block can be performed on various criteria and/or by various methods.

The processor 6 may select a block in which the number of invalid data is equal to or greater than a first threshold value among the blocks of the memory chips MC00 to MC33 as the original block.

The processor 6 may select a block in which the ratio of invalid data is equal to or greater than a second threshold value among the blocks of the memory chips MC00 to MC33 as the original block.

The processor 6 may select a predetermined number of blocks in which the total number of invalid data is equal to or greater than a third threshold value among the blocks of the memory chips MC00 to MC33 as the original blocks.

The processor 6 may select a predetermined number of blocks having the maximum ratio of invalid data among the blocks of the memory chips MC00 to MC33 as the original blocks.

In the following, the operations of processor 6 will be described assuming that the block of the nonvolatile memory NM00 is selected as the original block.

The processor 6 transmits a compaction read command and a physical address of the read destination to the command processing unit CP00 via the memory interface unit MI0 in order to read the data stored in the selected original block.

When the error correction by the command processing unit CP00 is not possible, the processor 6 first receives the data corrected by the correction unit CR0 and the redundant part from the command processing unit CP00 via the memory interface unit MI0. Next, the processor 6 stores the data corrected by the correction unit CR0 and the redundant part in the SRAM 5. Next, the processor 6 determines whether or not the data stored in the SRAM 5 and corresponding to the redundant part is valid data based on the address translation table AT, the logical address included in the redundant part, and the physical address of the read destination. Next, the processor 6 selects a destination block from free blocks. Next, the processor 6 transmits a compaction write command, a physical address of the write destination, and valid data to at least one of the command processing units CP00 to CP33 via at least one of the memory interface units MI0 to MI3 in order to write the valid data to the destination block of the memory chips MC00 to MC33.

When the data error correction by the command processing unit CP00 is possible, the processor 6 first receives the redundant part from the command processing unit CP00 via the memory interface unit MI0. Next, the processor 6 determines whether or not the data stored in the command processing unit CP00 and corresponding to the redundant part is valid data based on the address translation table AT stored in the SRAM 5, the physical address of the read destination, and the logical address included in the redundant part. Next, the processor 6 selects a destination block from free blocks of the memory chip MC00. Next, the processor 6 transmits a compaction write command, a physical address of the write destination, and a redundant part corresponding to the valid data to the command processing unit CP00 via the memory interface unit MI0.

After transmitting the compaction write command, the processor 6 transmits an erase command for erasing an original block and a physical address of an erase destination to the command processing unit CP00 via the memory interface unit MI0. In addition, the processor 6 updates the physical address of the read destination associated with the logical address of the valid data in the address translation table AT stored in the SRAM 5 with the physical address of the write destination. The processor 6 manages the erased original block as a free block.

Figure 2:
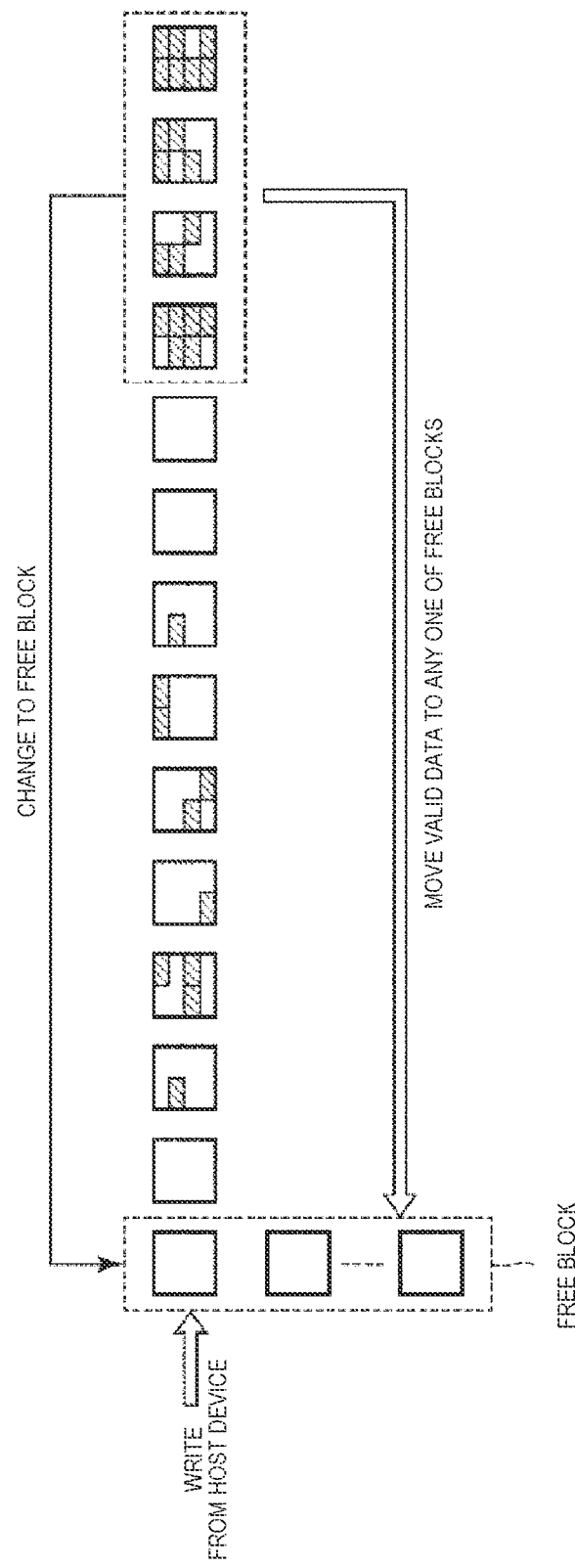
FIG. 2 is a diagram showing an outline of a compaction process.

FIG. 2 is a diagram showing an outline of compaction.

Each of the memory chips MC00 to MC33 includes a plurality of blocks. The memory system 1 manages a block in which data is not written as a free block. Upon receiving the write command and the logical address and data of the write destination from the host device 2, the memory system 1 acquires the physical address of the write destination according to the logical address of the write destination, and writes the data to the position specified by the physical address of the write destination. As the data writing to the block by the memory system 1 progresses, the number of invalid data in the block increases and the valid data in the block becomes fragmented. For example, the memory system 1 moves valid data in the original block in which the ratio or number of invalid data is equal to or greater than a predetermined value to a destination block selected from the free blocks. Movement of data in this context refers to writing data stored at one location to another location. After the movement of valid data from the original block to the destination block is completed, the memory system 1 manages the original block as a free block and subsequently erases the free block at some predetermined time after the movement. As a result, the memory system 1 can continue with write operations according to a write command(s) received from the host device 2.

Figure 3:
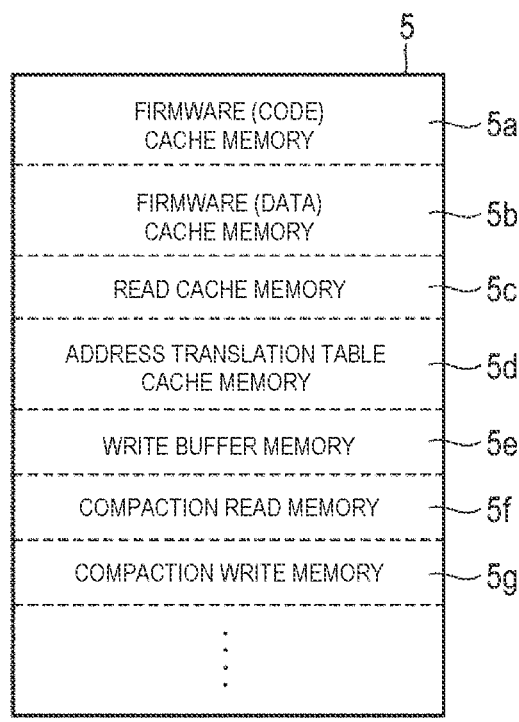
FIG. 3 is a diagram showing an example of use of a storage device provided in a controller of a memory system according to an embodiment.

FIG. 3 is a diagram showing an example of use of the SRAM 5 according to the present embodiment.

At least a part of the SRAM 5 is used as a cache memory 5a for storing the code of the firmware FW1.

At least a part of the SRAM 5 is used as a cache memory 5b for storing the data of the firmware FW1.

At least a part of the SRAM 5 is used as a read cache memory 5c for storing data read from any of the nonvolatile memories NM00 to NM33 via any of the memory interface units MI0 to MI3.

At least a part of the SRAM 5 is used as a cache memory 5d for storing the address translation table AT.

At least a part of the SRAM 5 is used as a write buffer memory 5e for storing data to be written to any of the nonvolatile memories NM00 to NM33 via any of the memory interface units MI0 to MI3.

At least a part of the SRAM 5 is used as a compaction read memory 5f for storing a redundant part or the like received from any of the command processing units CP00 to CP33 via any of the memory interface units MI0 to MI3 in compaction. The compaction read memory 5f is, for example, a buffer memory.

At least a part of the SRAM 5 is used as a compaction write memory 5g for storing a redundant part or the like to be transmitted to any of the command processing units CP00 to CP33 via any of the memory interface units MI0 to MI3 in compaction. The compaction write memory 5g is, for example, a buffer memory.

Figure 4:
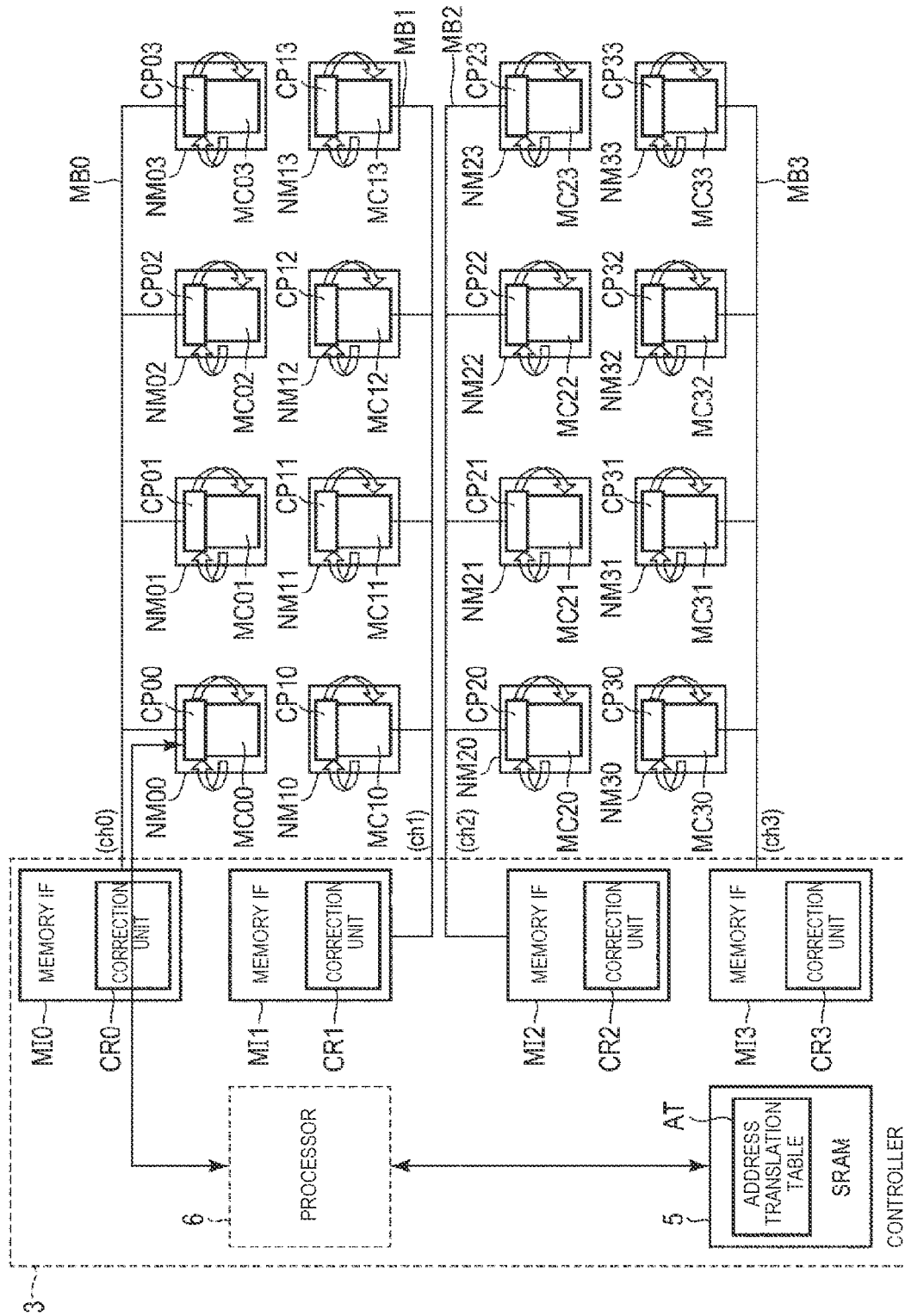
FIG. 4 is a block diagram showing an example of cooperation between a processor and a command processing unit according to an embodiment.

FIG. 4 is a block diagram showing an example of cooperation between the processor 6 and the command processing unit CP00 according to the present embodiment.

When performing compaction to the nonvolatile memory NM00, the processor 6 selects an original block from the memory chip MC00 based on the address translation table AT.

The processor 6 transmits a compaction read command and a physical address of the read destination to the command processing unit CP00 via the memory interface unit MI0 in order to read the data stored in the original block.

Upon receiving the compaction read command and the physical address of the read destination, the command processing unit CP00 reads the data and the redundant part from the position specified by the physical address of the read destination in the memory chip MC00.

The command processing unit CP00 performs an error correction process on the read data and redundant part.

In the present embodiment, the compaction operation is switched between the case where the command processing unit CP00 cannot correct the error for the data and the redundant part and the case where the error correction is possible.

First, an operation when the command processing unit CP00 cannot correct errors for the read data and redundant part will be described.

When the error correction for the data and the redundant part is not possible, the command processing unit CP00 transmits the data and the redundant part to the memory interface unit MI0.

The correction unit CR0 of the memory interface unit MI0 performs an error correction process on the data and the redundant part received from the command processing unit CP00. Then, the memory interface unit MI0 transmits the error-corrected data and redundant part to the processor 6.

The processor 6 receives the error-corrected data and redundant part from the memory interface unit MI0, and stores the received data and redundant part in the SRAM 5.

The processor 6 determines whether or not the data stored in the SRAM 5 is valid data based on the address translation table AT, the logical address included in the redundant part, and the physical address of the read destination.

The processor 6 selects the destination block from the free blocks.

The processor 6 transmits a compaction write command, a physical address of a write destination corresponding to the destination block, valid data, and a redundant part to at least one of the command processing units CP00 to CP33 via at least one of the memory interface units MI0 to MI3 in order to write the valid data to the destination block.

Upon receiving the compaction write command, the physical address of the write destination, the valid data, and the redundant part from the processor 6 via at least one of the memory interface units MI0 to MI3, at least one of the command processing units CP00 to CP33 writes the valid data and the redundant part to the position specified by the physical address of the write destination.

Next, an operation when the command processing unit CP00 can correct errors for the read data and redundant part will be described.

When the error correction for the data and the redundant part is possible, the command processing unit CP00 transmits the redundant part attached to the data to the processor 6 via the memory interface unit MI0. In this case, the command processing unit CP00 does not transmit the data to the processor 6.

When the processor 6 receives the redundant part from the command processing unit CP00 via the memory interface unit MI0, the processor 6 stores the redundant part in the SRAM 5.

The processor 6 determines whether or not the data stored in the command processing unit CP00 and corresponding to the redundant part is valid data based on the address translation table AT, the logical address included in the redundant part, and the physical address of the read destination.

The processor 6 selects a destination block from the free blocks in the memory chip MC00.

The processor 6 transmits a compaction write command, a physical address of a write destination corresponding to the destination block, and a redundant part to the command processing unit CP00 via the memory interface unit MI0 in order to write the valid data to the destination block in the memory chip MC00.

Upon receiving the compaction write command, the physical address of the write destination, and the redundant part from the processor 6 via the memory interface unit MI0, the command processing unit CP00 writes valid data corresponding to the received redundant part and the redundant part to the position specified by the physical address of the write destination in the memory chip MC00.

After transmitting the compaction write command, the processor 6 transmits an erase command for erasing an original block and a physical address of an erase destination corresponding to the original block to the command processing unit CP00 via the memory interface unit MI0.

Upon receiving the erase command and the physical address of the erase destination from the processor 6 via the memory interface unit MI0, the command processing unit CP00 performs an erase on the position specified by the physical address of the erase destination in the memory chip MC00.

The processor 6 updates the physical address of the read destination associated with the logical address corresponding to the valid data in the address translation table AT stored in the SRAM 5 with the physical address of the write destination. The processor 6 manages the erased original block as a free block.

Figure 5:
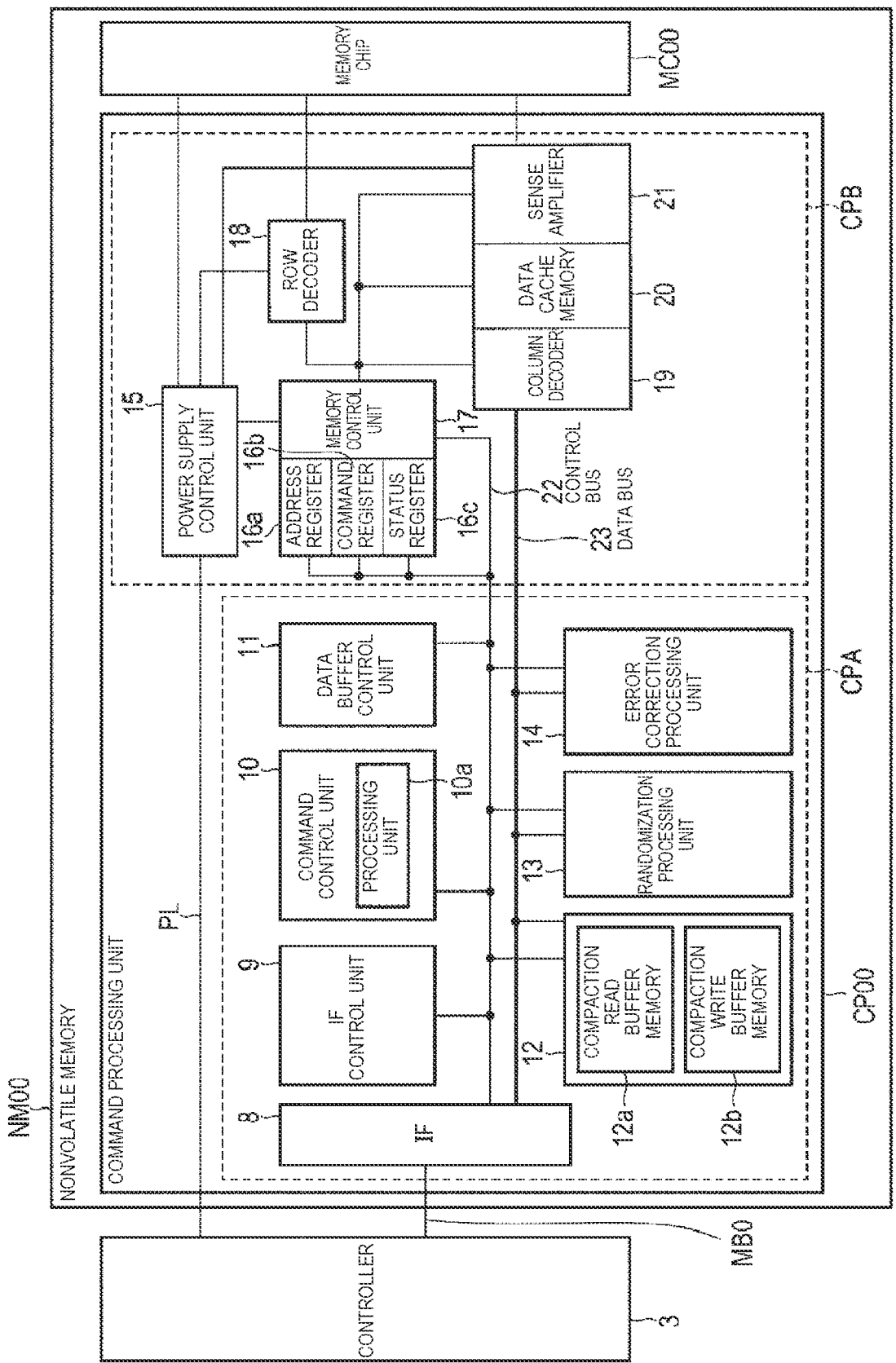
FIG. 5 is a block diagram showing an example of a configuration of a nonvolatile memory according to an embodiment.

FIG. 5 is a block diagram showing an example of the configuration of the nonvolatile memory NM00 according to the present embodiment. The nonvolatile memories NM01 to NM33 may also have the same configuration as the nonvolatile memory NM00.

The nonvolatile memory NM00 includes the command processing unit CP00 and the memory chip MC00.

The command processing unit CP00 is connected to the controller 3 by the memory bus MB0 and a power supply line PL. The command processing unit CP00 includes control circuits CPA and CPB. Each element of the control circuits CPA and CPB may be formed by an electronic circuit.

The control circuit CPA is connected to the controller 3. The control circuit CPB is connected to an input/output (I/O) unit of the memory chip MC00.

The control circuit CPA and the control circuit CPB are connected by a control bus 22 and a data bus 23.

The control circuit CPA includes an interface unit 8, an interface control unit 9, a command control unit 10, a data buffer control unit 11, a memory 12, a randomization processing unit 13, and an error correction processing unit 14.

The interface unit 8 is connected to the controller 3 via the memory bus MB0, and is connected to the control bus 22 and the data bus 23.

The interface control unit 9, the command control unit 10, the data buffer control unit 11, the memory 12, the randomization processing unit 13, and the error correction processing unit 14 are connected to the control bus 22.

The memory 12, the randomization processing unit 13, and the error correction processing unit 14 are connected to the data bus 23.

The interface unit 8 receives data, information, signals, commands, requests, messages, instructions, responses, and the like from the controller 3. Further, the interface unit 8 transmits data, information, signals, commands, requests, messages, instructions, responses, and the like to the controller 3.

The interface control unit 9 controls the interface unit 8.

The command control unit 10 interprets a command or request received from the controller 3 via the interface unit 8, and controls various elements of the command processing unit CP00 according to the command or request.

The memory 12 temporarily stores the data received from the controller 3 and the data read from the memory chip MC00. The memory 12 is, for example, a buffer memory or a cache memory. The memory 12 may be, for example, an SRAM, a DRAM, or a register. The memory 12 may be a volatile memory or a nonvolatile memory.

The data buffer control unit 11 manages the use of the memory 12 (for example, by tracking/designating an area as in use or an available area). The data buffer control unit 11 manages a corresponding relation between the area of the memory 12 and the data to be written to the memory chip MC00.

The randomization processing unit 13 performs randomization on the data written to the memory chip MC00. In this context, randomization refers to the setting of a random arrangement of data patterns based on a randomization key so that the data does not contain the same pattern consecutively. Randomization can prevent the occurrence of bit errors. In the following, data on which randomization has been performed is referred to as randomized data.

The randomization processing unit 13 performs a randomization release process on the randomized data read from the memory chip MC00. Here, the randomization release process is to obtain the original data (that is, the data before randomization) from the randomized data based on the application of a randomization key. The randomization release process may be referred to as "de-randomization" in some instances.

The error correction processing unit 14 encodes the data written to the memory chip MC00. In the present embodiment, by encoding, a parity part is added (appended) to the randomized data and the redundant part.

The error correction processing unit 14 decodes the randomized data and the redundant part read from the memory chip MC00, and performs an error correction process. Specifically, the error correction processing unit 14 performs, for example, hard bit correction having a lower error correction capability than that of the correction units CR0 to CR3.

In the present embodiment, "hard bit correction" means that the error detection process and the error correction process are performed on the read data by using the hard bit reading by the command processing unit CP00. As an error correction code, for example, a BCH code or a Reed-Solomon (RS) code is used. The hard bit reading refers to reading data in the memory cell using, for example, a reference read voltage or a voltage shifted from the reference read voltage by a predetermined voltage as a read voltage.

The control circuit CPB includes a power supply control unit 15, an address register 16a, a command register 16b, a status register 16c, a memory control unit 17, a row decoder 18, a column decoder 19, a data cache memory 20, and a sense amplifier 21.

The power supply control unit 15 is connected to the controller 3 by the power supply line PL. The power supply control unit 15 controls the supply of power to the memory chip MC00, the address register 16a, the command register 16b, the status register 16c, the memory control unit 17, the row decoder 18, the column decoder 19, the data cache memory 20, and the sense amplifier 21. The address register 16a, the command register 16b, the status register 16c, and the memory control unit 17 are connected to the control bus 22. The column decoder 19 is connected to the data bus 23. The row decoder 18, the column decoder 19, the data cache memory 20, and the sense amplifier 21 are connected to the memory control unit 17. The column decoder 19 controls a column gate of the memory chip MC00 according to a column address. The power supply control unit 15, the row decoder 18, and the sense amplifier 21 are connected to the input/output unit of the memory chip MC00. The row decoder 18 selectively drives a word line and a select gate line of the memory chip MC00 according to a row address. More specifically, the row decoder 18 controls potentials of an electrode layer, a drain-side select gate, and a source-side select gate of the memory cell array in the memory chip MC00. The sense amplifier 21 is connected to a bit line of the memory chip MC00, reads a potential of the bit line, and amplifies the read potential.

A write operation performed when the nonvolatile memory NM00 of FIG. 5 receives a write command (program command) from the controller 3 via the memory bus MB0 will be described below.

The command control unit 10 receives the write command, the physical address of the write destination, and the randomization key from the controller 3 via the memory bus MB0, the interface unit 8, and the control bus 22.

Further, the command control unit 10 stores write target data and the redundant part received by the interface unit 8 from the controller 3 via the memory bus MB0 in the memory 12 via the data bus 23.

The command control unit 10 uses the randomization processing unit 13 and the randomization key to perform randomization on the write target data stored in the memory 12, and then stores the randomized data in the memory 12. The command control unit 10 may perform randomization on the data by using another memory such as the data cache memory 20 instead of the memory 12.

The command control unit 10 uses the error correction processing unit 14 to generate a parity part for the randomized data and the redundant part stored in the memory 12, and stores the parity part in the memory 12. The command control unit 10 may perform an error correction process on the randomized data and the redundant part by using another memory such as the data cache memory 20 instead of the memory 12.

The command control unit 10 transmits a write command, a row address, and a column address to the memory control unit 17 via the control bus 22.

The command control unit 10 stores the randomized data, the redundant part, and the parity part stored in the memory 12 in the data cache memory 20 via the data bus 23.

The memory control unit 17 receives the write command, the row address, and the column address from the command control unit 10 via the control bus 22.

The memory control unit 17 stores the row address and the column address in the address register 16a, and stores the write command in the command register 16b.

The memory control unit 17 controls the row decoder 18 according to the row address of the address register 16a. The memory control unit 17 controls the column decoder 19 according to the column address of the address register 16a. Then, the memory control unit 17 amplifies the randomized data, the redundant part, and the parity part stored in the data cache memory 20 by the sense amplifier 21 and writes (programs) them to the memory chip MC00.

The memory control unit 17 stores the status indicating the write result in the status register 16c.

The command control unit 10 transmits the status stored in the status register 16c to the controller 3 via the control bus 22, the interface unit 8, and the memory bus MB0.

Next, a read operation performed when the nonvolatile memory NM00 of FIG. 5 receives a read command from the controller 3 via the memory bus MB0 will be described.

The command control unit 10 receives the read command, the physical address of the read destination, and the randomization key from the controller 3 via the memory bus MB0, the interface unit 8, and the control bus 22.

The command control unit 10 transmits the read command, a row address, and a column address to the memory control unit 17 via the control bus 22.

The memory control unit 17 receives the read command, the row address, and the column address from the command control unit 10 via the control bus 22.

The memory control unit 17 stores the row address and the column address in the address register 16a, and stores the read command in the command register 16b.

The memory control unit 17 controls the row decoder 18 according to the row address of the address register 16a. The memory control unit 17 controls the column decoder 19 according to the column address of the address register 16a. Then, the memory control unit 17 reads the randomized data, the redundant part, and the parity part from the memory chip MC00 and stores them in the data cache memory 20.

The command control unit 10 stores the randomized data, the redundant part, and the parity part stored in the data cache memory 20 in the memory 12 via the data bus 23.

The memory control unit 17 stores the status indicating the read result in the status register 16c.

The command control unit 10 uses the error correction processing unit 14 to perform an error correction process on the randomized data, the redundant part, and the parity part stored in the memory 12, and stores the error-corrected randomized data and redundant part in the memory 12.

The command control unit 10 uses the randomization processing unit 13 and the randomization key to perform the randomization release on the randomized data stored in the memory 12, and stores the randomization-released (de-randomized) data in the memory 12.

The command control unit 10 transmits the randomization-released data and the redundant part to the controller 3 via the data bus 23, the interface unit 8, and the memory bus MB0.

The command control unit 10 transmits the status stored in the status register 16c to the controller 3 via the control bus 22, the interface unit 8, and the memory bus MB0.

Next, a compaction read operation performed when the nonvolatile memory NM00 of FIG. 5 receives a compaction read command from the controller 3 via the memory bus MB0 will be described.

The command control unit 10 includes a processing unit 10a. The memory 12 includes a compaction read buffer memory 12a and a compaction write buffer memory 12b.

The processing unit 10a receives the compaction read command, a physical address of a read destination, and a randomization key from the controller 3 via the memory bus MB0, the interface unit 8, and the control bus 22.

The processing unit 10a transmits the compaction read command, a row address, and a column address to the memory control unit 17 via the control bus 22.

The memory control unit 17 receives the compaction read command, the row address, and the column address from the processing unit 10a via the control bus 22.

The memory control unit 17 stores the row address and the column address in the address register 16a, and stores the compaction read command in the command register 16b.

The memory control unit 17 controls the row decoder 18 according to the row address of the address register 16a. The memory control unit 17 controls the column decoder 19 according to the column address of the address register 16a. Then, the memory control unit 17 reads the randomized data, the redundant part, and the parity part from the memory chip MC00, and stores the randomized data, the redundant part, and the parity part in the data cache memory 20.

The processing unit 10a stores the randomized data, the redundant part, and the parity part stored in the data cache memory 20 in the memory 12 via the data bus 23.

The memory control unit 17 stores the status indicating the compaction read result in the status register 16c.

The processing unit 10a uses the error correction processing unit 14 to perform an error correction process on the randomized data, the redundant part, and the parity part stored in the memory 12. Here, it is assumed that the error correction processing unit 14 can correct errors for the randomized data and the redundant part.

In this case, the processing unit 10a stores the error-corrected randomized data and redundant part in the memory 12.

The processing unit 10a uses the randomization processing unit 13 and the randomization key to perform randomization release on the randomized data stored in the memory 12, and stores the randomization-released (de-randomized) data in the memory 12.

The processing unit 10a transmits the redundant part stored in the memory 12 to the controller 3 via the data bus 23, the interface unit 8, and the memory bus MB0.

Further, the processing unit 10a transmits the status stored in the status register 16c to the controller 3 via the control bus 22, the interface unit 8, and the memory bus MB0.

The processing unit 10a stores the randomization-released data, the redundant part, and the parity part in the compaction read buffer memory 12a.

Next, a compaction move process performed when the nonvolatile memory NM00 of FIG. 5 receives a compaction move command from the controller 3 via the memory bus MB0 will be described.

The processing unit 10a receives the compaction move command and a redundant part corresponding to the valid data from the controller 3 via the memory bus MB0, the interface unit 8, and the control bus 22.

Of the data, the redundant part, and the parity part stored in the compaction read buffer memory 12a, the processing unit 10a stores valid data corresponding to the received redundant part, the received redundant part, and the parity part of the valid data and the redundant part in the compaction write buffer memory 12b.

The compaction move process is repeatedly performed until the number of valid data stored in the compaction write buffer memory 12b becomes equal to or greater than a predetermined number.

Next, a compaction write operation performed when the nonvolatile memory NM00 of FIG. 5 receives a compaction write command from the controller 3 via the memory bus MB0 will be described.

The processing unit 10a receives the compaction write command, a physical address of a write destination, a redundant part, and a randomization key from the controller 3 via the memory bus MB0, the interface unit 8, and the control bus 22.

The processing unit 10a uses the randomization processing unit 13 and the randomization key to perform randomization on the valid data stored in the compaction write buffer memory 12b, and stores the randomized data in the compaction write buffer memory 12b.

The processing unit 10a uses the error correction processing unit 14 to generate a parity part for the randomized data and the redundant part stored in the compaction write buffer memory 12b, and stores the parity part in the compaction write buffer memory 12b.

The processing unit 10a transmits the compaction write command, a row address, and a column address to the memory control unit 17 via the control bus 22.

The processing unit 10a stores the randomized data, the redundant part, and the parity part stored in the compaction write buffer memory 12b in the data cache memory 20 via the data bus 23.

The memory control unit 17 receives the compaction write command, the row address, and the column address from the command control unit 10 via the control bus 22.

The memory control unit 17 stores the row address and the column address in the address register 16a, and stores the compaction write command in the command register 16b.

The memory control unit 17 controls the row decoder 18 according to the row address of the address register 16a. The memory control unit 17 controls the column decoder 19 according to the column address of the address register 16a. Then, the memory control unit 17 amplifies the randomized data, the redundant part, and the parity part stored in the data cache memory 20 by the sense amplifier 21 and writes them to the memory chip MC00.

The memory control unit 17 stores the status indicating the compaction write result in the status register 16c.

The processing unit 10a transmits the status stored in the status register 16c to the controller 3 via the control bus 22, the interface unit 8, and the memory bus MB0.

Figure 6:
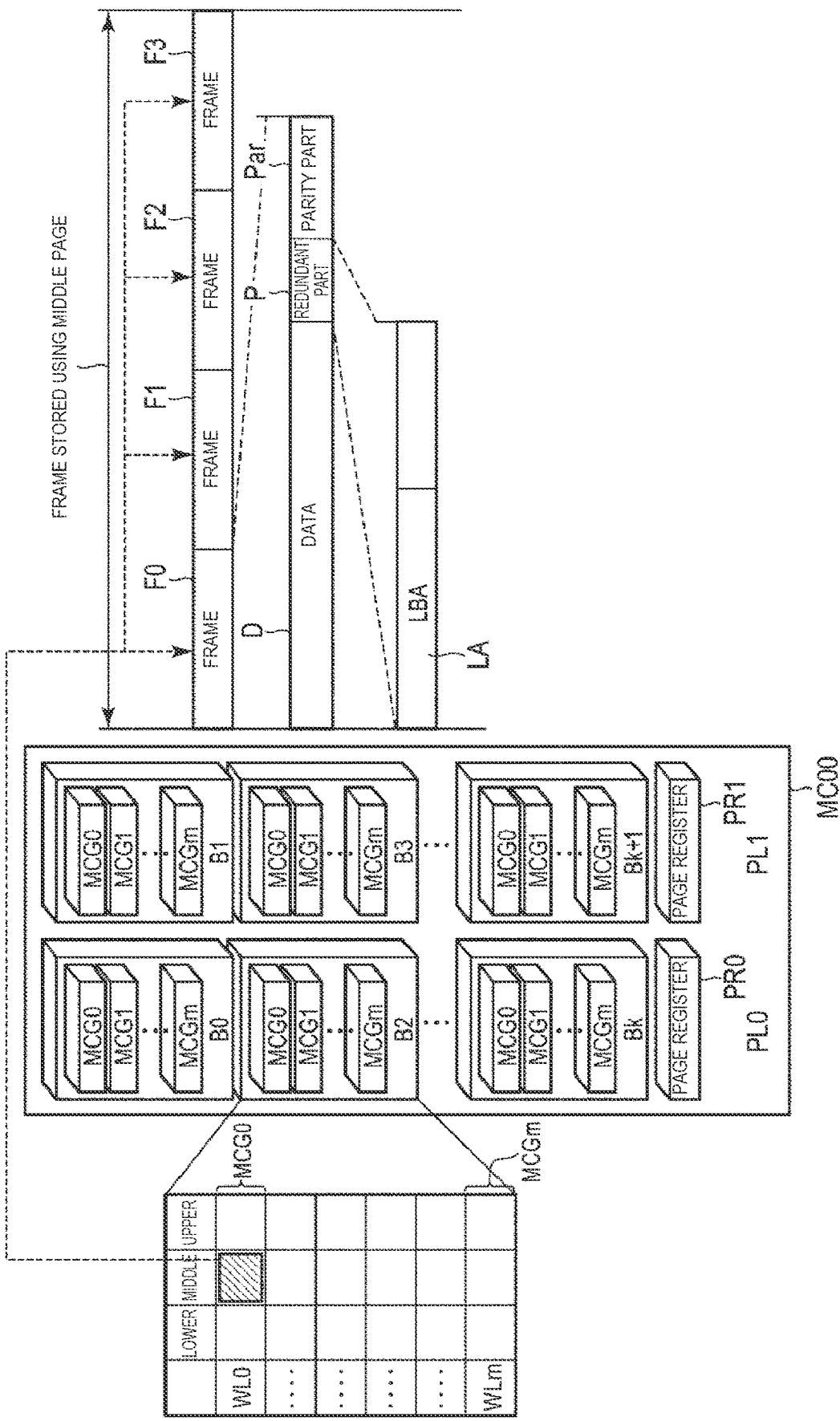
FIG. 6 is a diagram showing an example of a relationship between pages and frames in a memory chip according to an embodiment.

FIG. 6 is a diagram showing an example of the relationship between pages and frames F0 to F3 in the memory chip MC00 according to the present embodiment.

The memory chip MC00 includes a plurality of planes PL0 and PL1. The plane PL0 includes blocks B0, B2, . . . , and Bk, and a page register PR0. The plane PL1 includes blocks B1, B3, . . . , and Bk+1, and a page register PR1. In the following, the block B2 will be described as a representative, but the blocks B1, B3 to Bk+1 are also the same as the block B2.

The block B2 includes a plurality of pages. The block B2 includes a plurality of word lines WL0 to WLm and a plurality of memory cells connected to each of the plurality of word lines WL0 to WLm.

In the present embodiment, it is assumed that each memory cell is a triple level cell (TLC) capable of storing 3-bit information or a quad level cell (QLC) capable of storing 4-bit information. In other examples, each memory cell may be a single level cell (SLC), a multi-level cell (MLC), or capable of storing information of 5 bits or more. In the example of FIG. 6, the case where the memory cell is a TLC is illustrated.

Hereinafter, a group of memory cells that are collectively selected during the write operation and the read operation of the data is referred to as a "memory cell group". Then, in one memory cell group, a collection of 1-bit data written to (or read from) each of a plurality of memory cells is referred to as a "page".

A plurality of memory cells connected to the word line WL0 correspond to a memory cell group MCG0. Similarly, a plurality of memory cells connected to each of the word lines WL1 to WLm correspond to memory cell groups MCG1 to MCGm, respectively. The individual bits of 3-bit data stored in the TLC type memory cell are referred to as a lower bit, a middle bit, and an upper bit in this order from the lower order. The set of the lower bits stored in the memory cell group MCG0 is referred to as a lower page, the set of the middle bits stored in the memory cell group MCG0 is referred to as a middle page, and the set of the upper bits stored in the memory cell group MCG0 is referred to as an upper page. Each of the memory cell groups MCG1 to MCGm also includes a lower page, a middle page, and an upper page, similarly to the memory cell group MCG0.

The lower page corresponding to the word line WL0 can store four frames using the lower bits of the memory cell group MCG0. The middle page corresponding to the word line WL0 can store four frames F0 to F3 using the middle bits of the memory cell group MCG0. The upper page corresponding to the word line WL0 can store four frames using the upper bits of the memory cell group MCG0. In FIG. 6, the four frames F0 to F3 stored in the middle page corresponding to the word line WL0 are illustrated as an example.

The number of frames that can be stored using any of the lower page, the middle page, and the upper page may be changed, and may be, for example, 1 to 3, or 5 or more.

The frame F0 includes data D, a redundant part P, and a parity part Par.

The data D is, for example, user data. The data D may be, for example, randomized data.

The redundant part P includes a logical address LA of the data D.

The parity part Par includes information for detecting and correcting an error occurring in the data D and the redundant part P.

The frames F1 to F3 may also include the same information as the frame F0.

Figure 7:
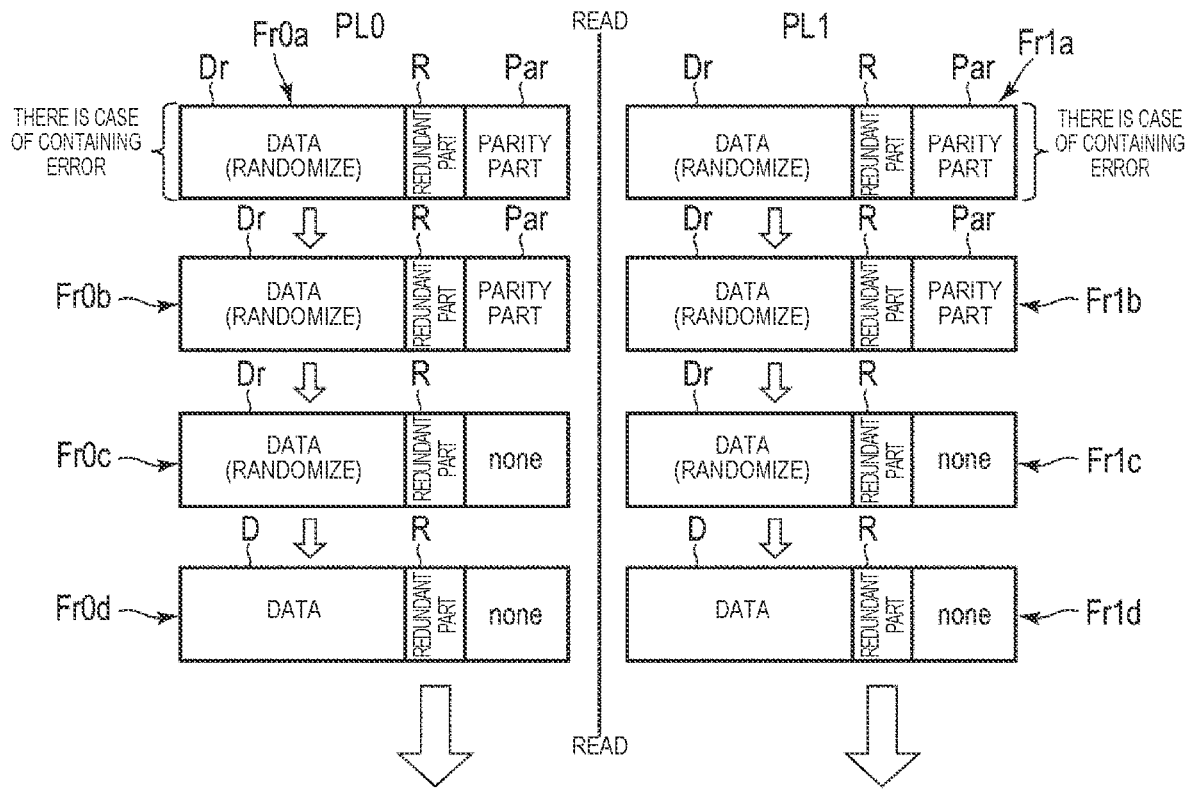
FIG. 7 is a diagram illustrating changes in frames read from two planes according to a compaction read command according to an embodiment.

FIG. 7 is a diagram illustrating changes in frames Fr0a and Fr1a read from the planes PL0 and PL1 according to a compaction read command according to the present embodiment.

The processing unit 10a performs a compaction read operation of the frame Fr0a from the plane PL0. The frame Fr0a includes randomized data Dr, a redundant part R, and a parity part Par. The read frame Fr0a may contain an error.

The error correction processing unit 14 performs an error correction process for the randomized data Dr and the redundant part R of the frame Fr0a to generate a frame Fr0b.

The error correction processing unit 14 generates a frame Fr0c in which the parity part Par is deleted from the frame Fr0b.

The randomization processing unit 13 performs randomization release on the randomized data Dr of the frame Fr0c, and generates a frame Fr0d including the data D and the redundant part R.

The processing unit 10a stores the frame Fr0d in the compaction read buffer memory 12a.

The frame Fr1a read from the plane PL1 changes to frames Fr1b to Fr1d in the same manner as the frame Fr0a.

Figure 8:
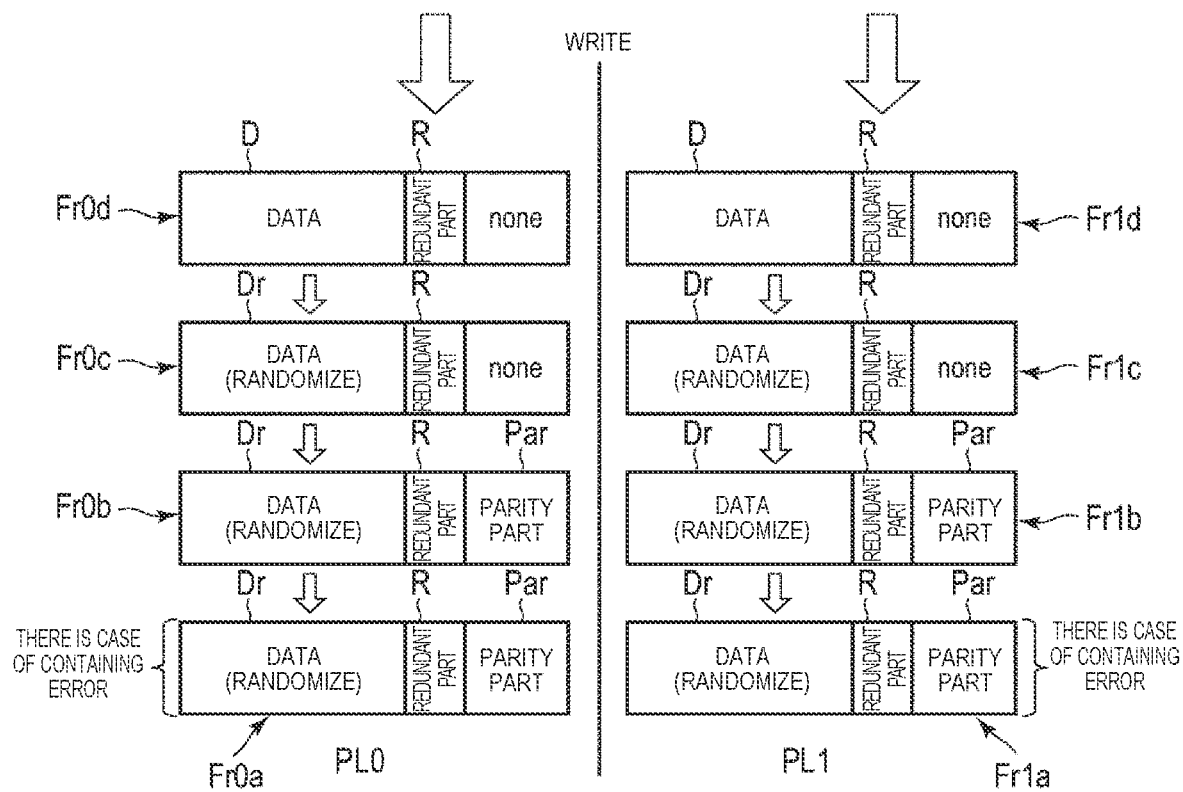
FIG. 8 is a diagram illustrating changes in frames written on two planes according to a compaction write command according to an embodiment.

FIG. 8 is a diagram illustrating changes in the frames Fr0d and Fr1d written on the planes PL0 and PL1 according to a compaction write command according to the present embodiment.

The processing unit 10a reads the frame Fr0d stored in the compaction write buffer memory 12b. The frame Fr0d includes the data D and the redundant part R.

The randomization processing unit 13 performs randomization on the data D of the frame Fr0d, and generates the frame Fr0c including the randomized data Dr and the redundant part R.

The error correction processing unit 14 adds the parity part Par to the randomized data Dr and the redundant part R of the frame Fr0c to generate the frame Fr0b.

The processing unit 10a performs a process for writing the frame Fr0b to the plane PL0.

The frame Fr0b written on the plane PL0 may contain an error. The frame Fr0b containing this error is referred to as the frame Fr0a in FIG. 8.

The frame Fr1d written on the plane PL1 changes to the frames Fr1c to Fr1a in the same manner as the frame Fr0d.

Figure 9:
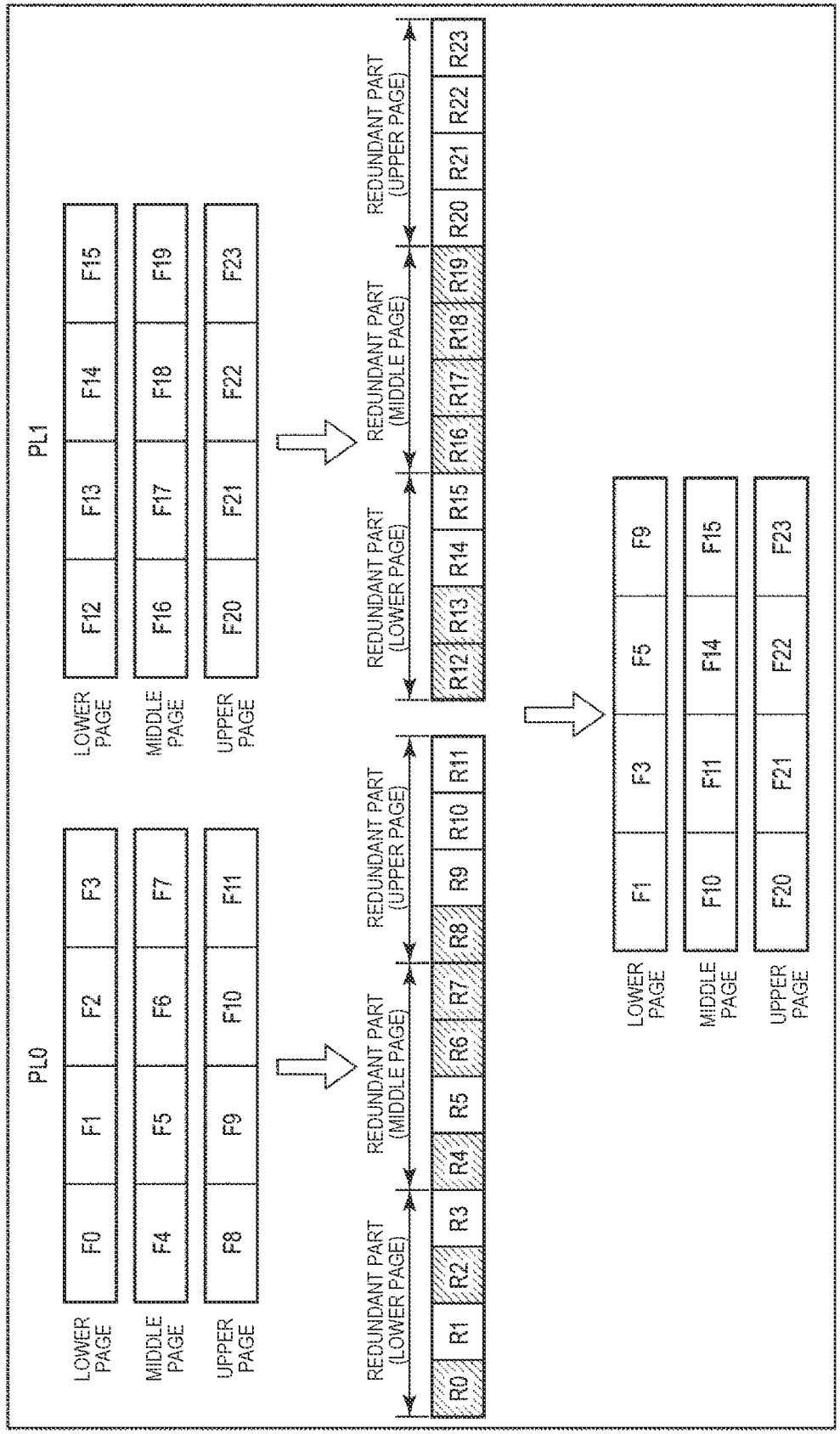
FIG. 9 is a diagram showing an example of a valid frame determination performed by a memory system according to the present embodiment.

FIG. 9 is a diagram showing an example of valid frame determination performed by the memory system 1 according to the present embodiment.

The command processing unit CP00 reads frames F0 to F3 stored in the lower page, frames F4 to F7 stored in the middle page, and frames F8 to F11 stored in the upper page from the original page of the plane PL0 of the memory chip MC00 to be compacted.

Further, the command processing unit CP00 reads frames F12 to F15 stored in the lower page, frames F16 to F19 stored in the middle page, and frames F20 to F23 stored in the upper page from the original page of the plane PL1 of the memory chip in parallel with the frames F0 to F11.

Redundant parts R0 to R3 are information read from the lower page in the original page of the plane PL0. Redundant parts R4 to R7 are information read from the middle page in the original page of the plane PL0. Redundant parts R8 to R11 are information read from the upper page in the original page of the plane PL0.

Redundant parts R12 to R15 are information read from lower page in the original page of the plane PL1. Redundant parts R16 to R19 are information read from the middle page in the original page of the plane PL1. Redundant parts R20 to R23 are information read from the upper page in the original page of the plane PL1.

The command processing unit CP00 transmits the redundant parts R0 to R23 to the controller 3.

In the present embodiment, a plurality of redundant parts may be collectively transmitted from the command processing unit CP00 to the controller 3. For example, in the plane PL0, the redundant parts R0 to R3 included in the lower page, the redundant parts R4 to R7 included in the middle page, and the redundant parts R8 to R11 included in the upper page are continuously transferred from the command processing unit CP00 to the controller 3. In other words, the redundant parts R0 to R11 are collectively transferred from the command processing unit CP00 to the controller 3 as a group. For example, in the plane PL1, the redundant parts R12 to R15 included in the lower page, the redundant parts R16 to R19 included in the middle page, and the redundant parts R20 to R23 included in the upper page are continuously transferred back-to-back from the command processing unit CP00 to the controller 3 without pause. In other words, the redundant parts R12 to R23 are collectively transferred from the command processing unit CP00 to the controller 3. As a result, the transfer speed can be increased.

The controller 3 determines whether each of the frames F0 to F23 is valid or invalid based on the address translation table AT, the redundant parts R0 to R23, and the physical address of the original page.

The example of FIG. 9 illustrates that the frames F1, F3, F5, F9 to F11, F14, F15, F20 to F23 including the redundant parts R1, R3, R5, R9 to R11, R14, R15, and R20 to R23 are valid. It illustrates that the frames F0, F2, F4, F6 to F8, F12, F13, and F16 to F19 including the redundant parts R0, R2, R4, R6 to R8, R12, R13, and R16 to R19 are invalid.

The controller 3 transmits the redundant parts R1, R3, R5, R9 to R11, R14, R15, and R20 to R23 corresponding to the frames F1, F3, F5, F9 to F11, F14, F15, and F20 to F23 determined to be valid to the command processing unit CP00.

In the present embodiment, a plurality of redundant parts may be collectively transmitted from the controller 3 to the command processing unit CP00. As a result, the transfer speed can be increased.

At the time of a compaction write operation, the command processing unit CP00 writes the frames F1, F3, F5, F9 to F11, F14, F15, and F20 to F23 including the received redundant parts R1, R3, R5, R9 to R11, R14, R15, and R20 to R23 to a destination page.

Figure 10:
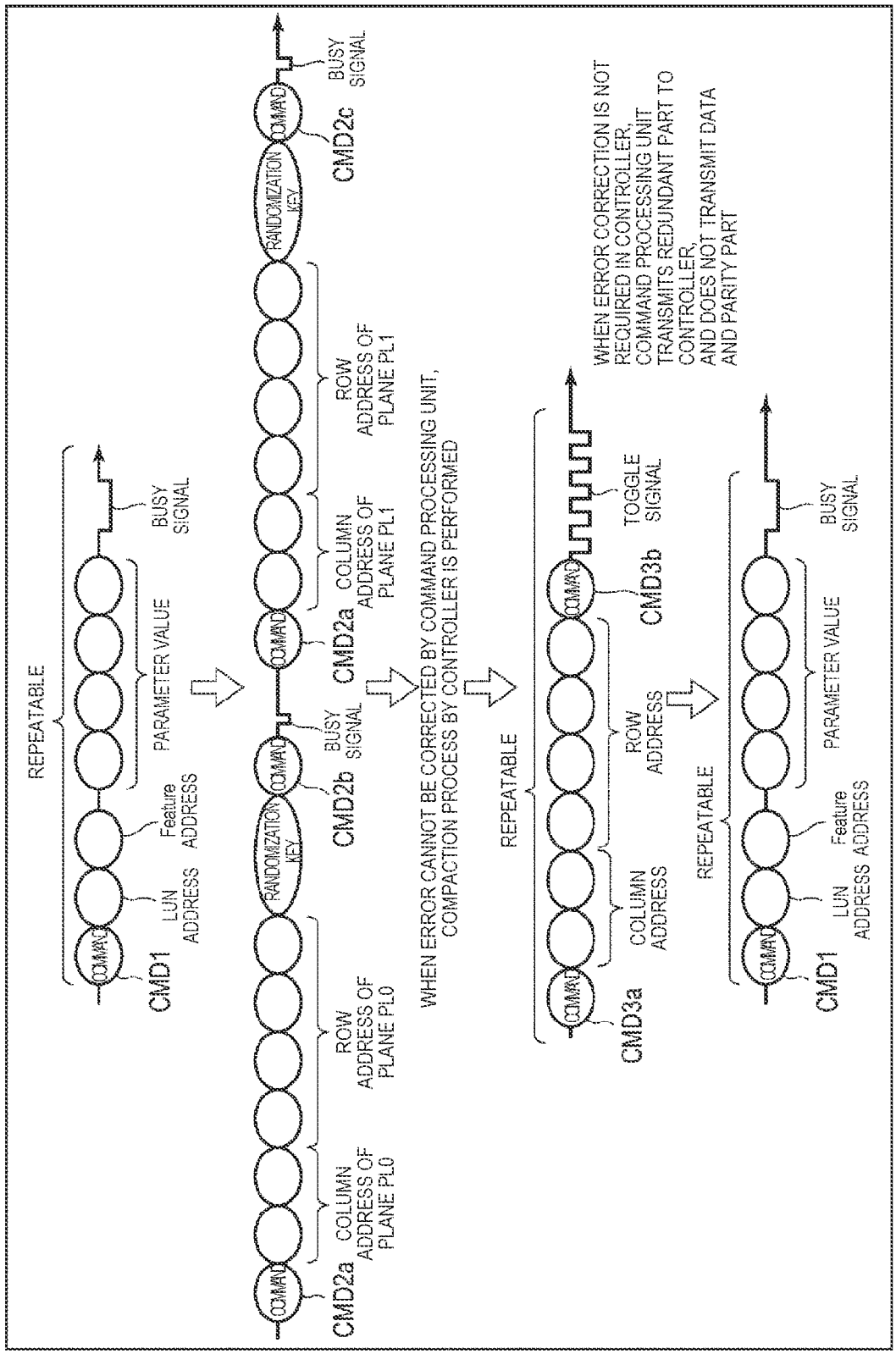
FIG. 10 is a diagram showing an example of a command transmitted from a controller to a command processing unit in order to read in a compaction process.

FIG. 10 is a diagram showing an example of a command transmitted from the controller 3 to the command processing unit CP00 for reading in compaction.

First, the command processing unit CP00 receives, from the controller 3, a set feature command CMD1 for setting parameter values, a logical unit number (LUN) address, a Feature address, parameter values, and a busy signal indicating the end of the command. The LUN address specifies any of the devices included in the nonvolatile memories NM00 to NM33. The Feature address specifies a parameter. The command processing unit CP00 sets the parameter values for the device specified by the LUN address and the parameter specified by the Feature address. The command processing unit CP00 may repeatedly (continuously) receive the set feature command CMD1 to the busy signal and repeatedly (continuously) perform the parameter setting.

In the present embodiment, the Feature address and the parameter values of the set feature command CMD1 are used, for example, for the operation of transitioning the specified nonvolatile memory to a compaction mode or returning to a normal operation mode. This operation and the like is referred a "mode change" or a "mode change operation." For example, the command processing unit CP00 transitions the nonvolatile memory NM00 from the normal operation mode to the compaction mode according to the LUN address, the Feature address, and the parameter values.

Further, the Feature address and the parameter values attached to the set feature command CMD1 are used to change voltage value information used when the compaction read command is performed or the compaction write command is performed.

The command processing unit CP00 receives, from the controller 3, an address input command CMD2a with a randomization key, column addresses of the plane PL0, row addresses of the plane PL0, a randomization key of the plane PL0, a plane switching command CMD2b, a busy signal indicating the end of the command, an address input command CMD2a with a randomization key, column addresses of the plane PL1, row addresses of the plane PL1, a randomization key of the plane PL1, a compaction read command CMD2c, and a busy signal indicating the end of the command.

Then, the command processing unit CP00 reads a frame stored in a position corresponding to the column address of the plane PL0 and the row address of the plane PL0. Then, the command processing unit CP00 performs an error correction process on the read frame, and performs randomization release on the randomized data included in the error-corrected frame by using the randomization key of the plane PL0.

Further, the command processing unit CP00 reads a frame stored in a position corresponding to the column address of the plane PL1 and the row address of the plane PL1. Then, the command processing unit CP00 performs an error correction process on the read frame, and performs randomization release on the randomized data included in the error-corrected frame by using the randomization key of the plane PL1.

The command processing unit CP00 transmits the read frame to the controller 3 when the error correction for the read frame is not possible, and the controller 3 performs an error correction process having a higher error correction capability than that of the command processing unit CP00 on the frame. Thereby, compaction is performed.

When the error correction for the read frame is possible, the command processing unit CP00 receives, from the controller 3, an address input command CMD3a for outputting the redundant part of the frame, column addresses, row addresses, a data-out (data output start) command CMD3b, and a toggle signal indicating the end of the command. When the data-out command CMD3b is received, the command processing unit CP00 transmits a redundant part corresponding to the column address and the row address to the controller 3, and does not transmit the data to the controller 3. The command processing unit CP00 may repeatedly (continuously) receive the address input command CMD3a to the toggle signal, and repeatedly (continuously) perform the transmission of the redundant part to the controller 3.

The command processing unit CP00 receives, from the controller 3, a set feature command CMD1 for terminating a compaction read operation, a LUN address, a Feature address, parameter values, and a busy signal indicating the end of the command. The command processing unit CP00 sets the parameter values for the device specified by the LUN address and the parameter specified by the Feature address. For example, the command processing unit CP00 transitions the nonvolatile memory NM00 from the compaction mode to the normal operation mode according to the LUN address, the Feature address, and the parameter values. The command processing unit CP00 may repeatedly (continuously) receive the set feature command CMD1 to the busy signal and repeatedly (continuously) perform the end of the compaction read operation.

Figure 11:
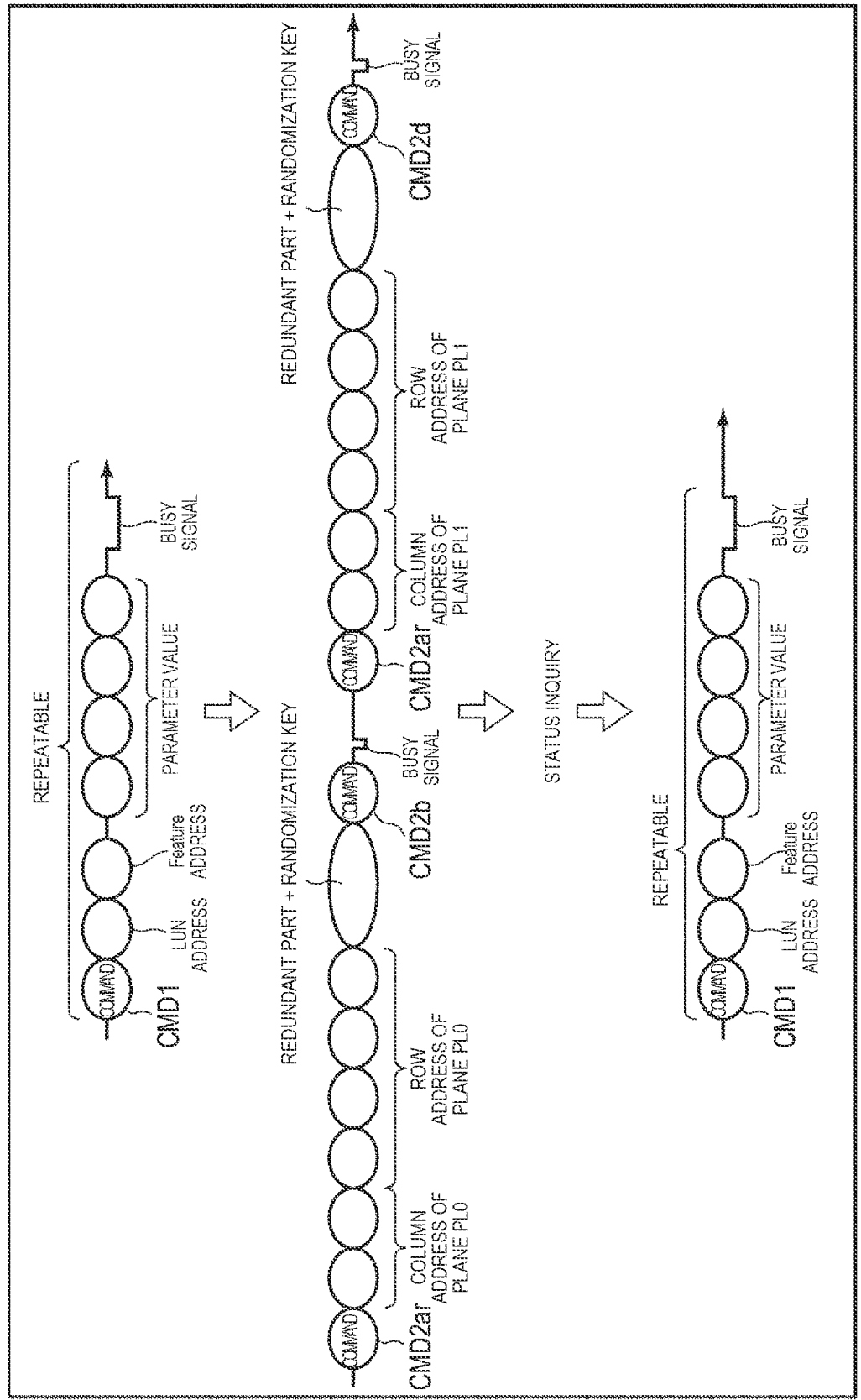
FIG. 11 is a diagram showing an example of a command transmitted from a controller to a command processing unit in order to write in a compaction process.

FIG. 11 is a diagram showing an example of a command transmitted from the controller 3 to the command processing unit CP00 for writing in compaction.

First, the command processing unit CP00 receives, from the controller 3, a set feature command CMD1 for setting parameter values, a LUN address, a Feature address, parameter values, and a busy signal indicating the end of the command. The LUN address specifies any of the devices included in the nonvolatile memories NM00 to NM33. The command processing unit CP00 sets the parameter values for the device specified by the LUN address and the parameter specified by the Feature address. For example, the command processing unit CP00 transitions the nonvolatile memory NM00 from the normal operation mode to the compaction mode according to the LUN address, the Feature address, and the parameter values. The command processing unit CP00 may repeatedly (continuously) receive the command CMD1 to the busy signal and repeatedly (continuously) perform the parameter setting.

The command processing unit CP00 receives, from the controller 3, an address input command CMD2ar with a redundant part for writing in compaction and a randomization key, column addresses of the plane PL0, row addresses of the plane PL0, a redundant part of the plane PL0, a randomization key of the plane PL0, a plane switching command CMD2b, a busy signal indicating the end of the command, an address input command CMD2ar with a redundant part and a randomization key, column addresses of the plane PL1, row addresses of the plane PL1, a redundant part of the plane PL1, a randomization key of the plane PL1, a compaction write command CMD2d, and a busy signal indicating the end of the command.

Then, the command processing unit CP00 performs randomization on data of the frame including the received redundant part of the plane PL0 by using the randomization key of the plane PL0, and generates a frame in which a parity part is added to the randomized data and the redundant part of the plane PL0. Then, the command processing unit CP00 writes the generated frame to the position corresponding to the column address of the plane PL0 and the row address of the plane PL0.

Further, the command processing unit CP00 performs randomization on data of the frame including the received redundant part of the plane PL1 by using the randomization key, and generates a frame in which a parity part is added to the randomized data and the redundant part of the plane PL1. Then, the command processing unit CP00 writes the generated frame to the position corresponding to the column address of the plane PL1 and the row address of the plane PL1.

Upon receiving a status inquiry from the controller 3, the command processing unit CP00 transmits the status indicating whether or not the compaction write operation has ended to the controller 3.

The command processing unit CP00 receives, from the controller 3, a set feature command CMD1 for terminating a compaction write operation, a LUN address, a Feature address, parameter values, and a busy signal indicating the end of the command. The command processing unit CP00 sets the parameter values for the device specified by the LUN address and the parameter specified by the Feature address. For example, the command processing unit CP00 transitions the nonvolatile memory NM00 from the compaction mode to the normal operation mode according to the LUN address, the Feature address, and the parameter values.

The command processing unit CP00 may repeatedly (continuously) receive the set feature command CMD1 to the busy signal and repeatedly (continuously) perform the end of the compaction write operation.

Figure 12:
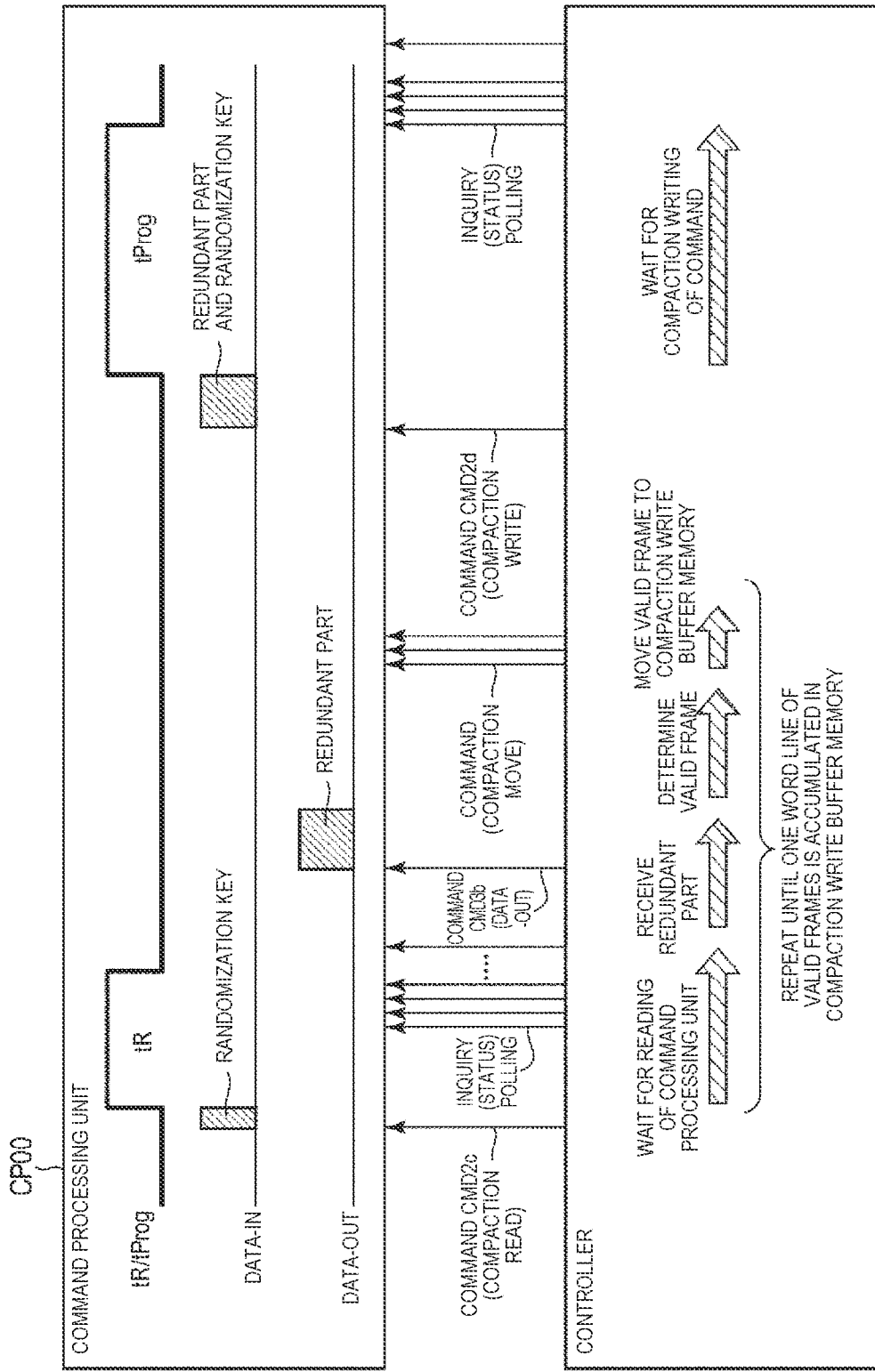
FIG. 12 is a diagram showing an example of cooperation between a controller and a command processing unit according to an embodiment.

FIG. 12 is a diagram showing an example of cooperation between the controller 3 and the command processing unit CP00 according to the present embodiment.

In FIG. 12, the time for the command processing unit CP00 to perform the compaction read operation is represented by tR. The time for the command processing unit CP00 to perform the compaction write operation is represented by tProg.

The controller 3 transmits the physical address, the randomization key, and the compaction read command CMD2c to the command processing unit CP00 (this can be referred to as "data-in" or a "data-in operation").

Upon receiving the physical address, the randomization key, and the compaction read command CMD2c from the controller 3, the command processing unit CP00 reads a frame from the position indicated by the physical address on the memory chip MC00 and performs randomization release on the randomized data included in the read frame by using the randomization key.

The controller 3 waits for the compaction read operation by the command processing unit CP00, inquires about the status (for example, by polling or the like) of the command processing unit CP00, and checks the status of the compaction read operation.

When the compaction read operation of the command processing unit CP00 is ended, the controller 3 transmits the data-out command CMD3b for acquiring the physical address and the redundant part to the command processing unit CP00.

When the command processing unit CP00 receives the physical address and the data-out command CMD3b from the controller 3, the command processing unit CP00 transmits a redundant part corresponding to the physical address to the controller 3 (data-out of the redundant part).

The controller 3 receives the redundant part from the command processing unit CP00.

The controller 3 determines whether or not the frame corresponding to the redundant part is a valid frame based on the redundant part received from the command processing unit CP00, the address translation table AT, and the physical address.

The controller 3 transmits, to the command processing unit CP00, a compaction move command for moving a valid frame stored in the compaction read buffer memory 12a of the command processing unit CP00 to the compaction write buffer memory 12b of the command processing unit CP00 and validity identification information (for example, a logical address or a redundant part) based on the determination result as to whether or not the frame is the valid frame.

The command processing unit CP00 moves the valid frame stored in the compaction read buffer memory 12a to the compaction write buffer memory 12b based on the compaction move command and the validity identification information from the controller 3.

The process from the transmission of the physical address, the randomization key, and the compaction read command CMD2c by the controller 3 to the movement of the valid data from the compaction read buffer memory 12a to the compaction write buffer memory 12b by the command processing unit CP00 is repeated until the number of valid frames that can be stored in one word line is accumulated in the compaction write buffer memory 12b.

When the controller 3 determines that the number of valid frames that can be stored in one word line is stored in the compaction write buffer memory 12*b*, the controller 3 transmits the physical address, the redundant part, the randomization key, and the compaction write command CMD2*d* to the command processing unit CP00 (data-in of the redundant part and the randomization key).

Upon receiving the physical address, the redundant part, the randomization key, and the compaction write command CMD2*d* from the controller 3, the command processing unit CP00 randomizes the data by using the randomization key. The command processing unit CP00 adds a parity part to the randomized data and the redundant part. The command processing unit CP00 generates a frame including the randomized data, the redundant part, and the parity part. Then, the command processing unit CP00 writes the generated frame to the position specified by the physical address.

The controller 3 waits for the compaction write operation of the command processing unit CP00, inquires about the status (for example, polling) of the command processing unit CP00, and checks the status of the compaction write operation.

The controller 3 detects the end of the compaction write operation based on the status check result.

Figure 13:
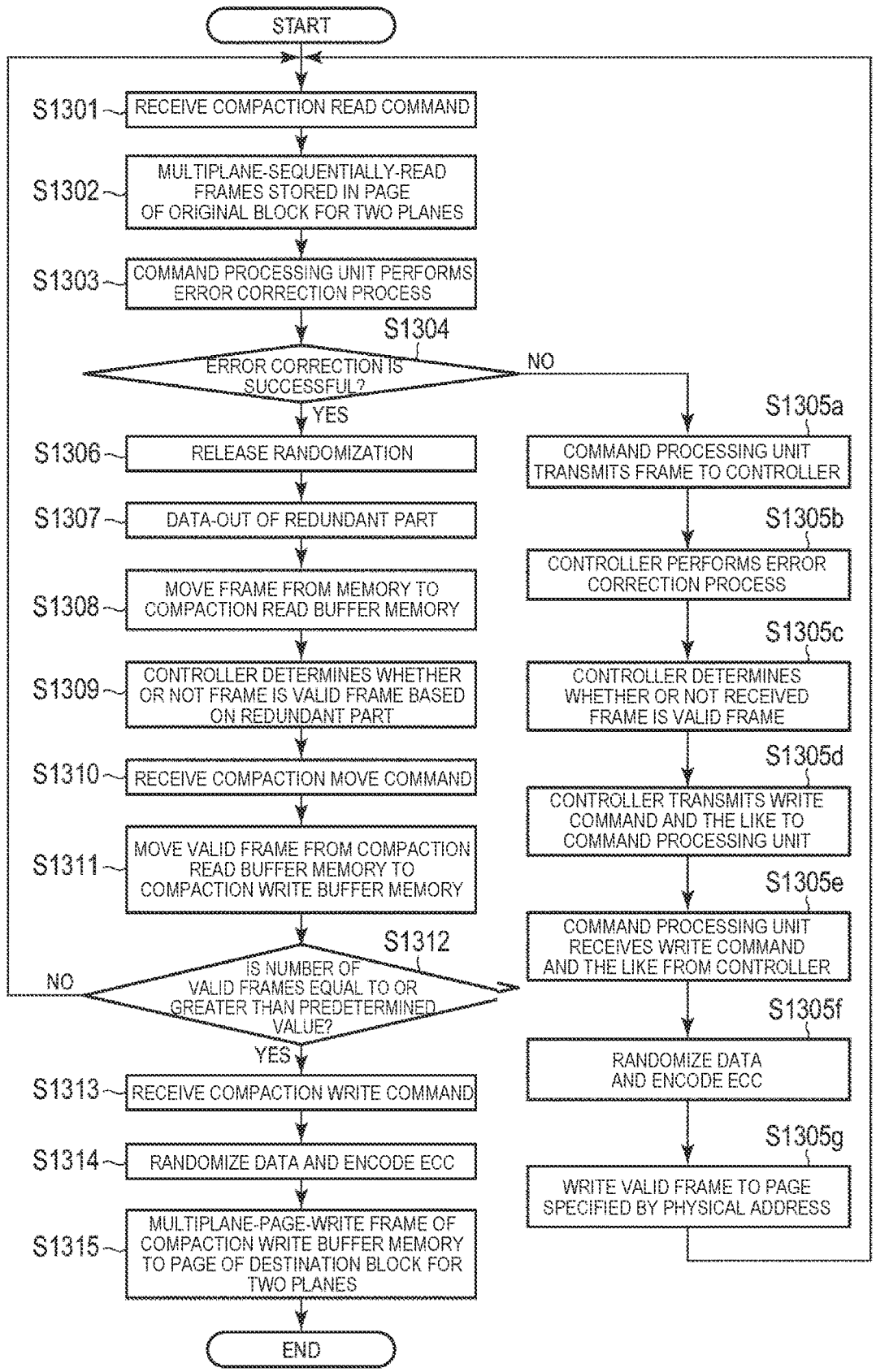
FIG. 13 is a flowchart of processing performed by a command processing unit and a controller according to an embodiment.

FIG. 13 is a flowchart showing an example of processing performed by the command processing unit CP00 and the controller 3 according to the present embodiment.

In FIG. 13, a case where the memory chip MC00 includes a TLC memory cell will be described as an example.

The controller 3 transmits a compaction read command and a physical address to the command processing unit CP00. The command processing unit CP00 receives the compaction read command and the physical address from the controller 3 (S1301).

The command processing unit CP00 multiplane-sequentially-reads the frames stored in the page specified by the physical address in the original block for the two planes PL0 and PL1 of the memory chip MC00 according to the compaction read command (S1302).

Specifically, upon receiving the compaction read command, the command processing unit CP00 performs a read operation of 3 pages/word line [lower page/middle page/upper page]×2 planes, and stores the read frame in the memory 12.

The command processing unit CP00 performs an error correction process on the frame stored in the memory 12 (S1303).

The command processing unit CP00 determines whether or not the error correction for the frame is successful (S1304).

When the error correction for the frame is not successful, the command processing unit CP00 transmits the frame including the data and the redundant part to the controller 3 (S1305*a*).

The controller 3 performs the error correction process on the frame received from the command processing unit CP00 (S1305*b*).

The controller 3 determines whether or not the frame received from the command processing unit CP00 is a valid frame based on the error-corrected frame, the address translation table AT, and the physical address of the read destination (S1305*c*).

Then, the controller 3 transmits, for example, a write command for writing a valid frame to the destination block of the nonvolatile memories NM00 to NM33, the physical address, the valid data, the redundant part, and the randomization key to the command processing unit CP00 (S1305*d*).

The command processing unit CP00 receives the write command, the physical address, the redundant part, and the randomization key from the controller 3 (S1305*e*).

The command processing unit CP00 performs data randomization using the randomization key and addition of the parity part on the valid frame including the valid data and the redundant part received from the controller 3 (S1305*f*).

The command processing unit CP00 writes the valid frame including the randomized data, the redundant part, and the parity part to the page specified by the physical address (S1305*g*). Then, the process moves to S1301.

When the error correction for the frame is successful, the command processing unit CP00 performs randomization release on the randomized data of the frame stored in the memory 12 and stores the frame including the randomization-released data and the redundant part in the memory 12 (S1306).

The command processing unit CP00 transmits the redundant part of the frame including the randomization-released data to the controller 3 (data-out: S1307).

Specifically, when the data size of the redundant part is 16 bytes, for example, the command processing unit CP00 performs data-out of the redundant part of (16 bytes×4 frames×3 pages/word line [lower page/middle page/upper page]×2 planes=) 384 bytes on the controller 3.

The command processing unit CP00 moves the frame including the randomization-released data and the redundant part stored in the memory 12 to the compaction read buffer memory 12*a* (S1308). The command processing unit CP00 can receive a read command from the host device 2 by moving a frame stored in, for example, a latch circuit of the memory 12 to the compaction read buffer memory 12*a*.

The controller 3 determines whether or not the frame including the redundant part received from the command processing unit CP00 is a valid frame based on the logical address included in the redundant part received from the command processing unit CP00, the address translation table AT, and the physical address (S1309).

The controller 3 transmits a compaction move command and validity identification information to the command processing unit CP00. The command processing unit CP00 receives the compaction move command and the validity identification information from the controller 3 (S1310).

Upon receiving the compaction move command and the validity identification information, the command processing unit CP00 moves the valid frames specified by the validity identification information among the frames stored in the compaction read buffer memory 12*a* in a state of being packed in the compaction write buffer memory 12*b* (S1311). The command processing unit CP00 determines, for example, a frame including a redundant part corresponding to the validity identification information as a valid frame.

The controller 3 determines whether or not the number of valid frames stored in the compaction write buffer memory 12*b* is equal to or greater than a predetermined value (S1312).

Specifically, the controller 3 determines whether or not (4 frames×3 pages/word line [lower page/middle page/upper page]×2 planes=) 24 valid frames are accumulated in the compaction write buffer memory 12*b*.

When the number of valid frames stored in the compaction write buffer memory 12*b* is not equal to or greater than the predetermined value, the command processing unit CP00 waits until a new compaction read command is received from the controller 3. When the command processing unit CP00 receives a new compaction read command from the controller 3, the process performs S1301 or later.

When the number of valid frames stored in the compaction write buffer memory 12b is equal to or greater than the predetermined value, the controller 3 transmits the compaction write command, the physical address, the redundant part, and the randomization key to the command processing unit CP00 (data-in). The command processing unit CP00 receives the compaction write command, the physical address, the redundant part, and the randomization key from the controller 3 (S1313).

The command processing unit CP00 performs data randomization using the randomization key and addition of the parity part on the valid frame stored in the compaction write buffer memory 12b (S1314).

The command processing unit CP00 multiplane-page-writes the valid frame including the randomized data, the redundant part, and the parity part to the page specified by the physical address in the destination block for the two planes PL0 and PL1. (S1315).

Specifically, the command processing unit CP00 multi-plane-sequentially-writes (4 frames×3 pages/word line [lower page/middle page/upper page]×2 planes=) 24 valid frames for two planes PL0 and PL1.

Figure 14:
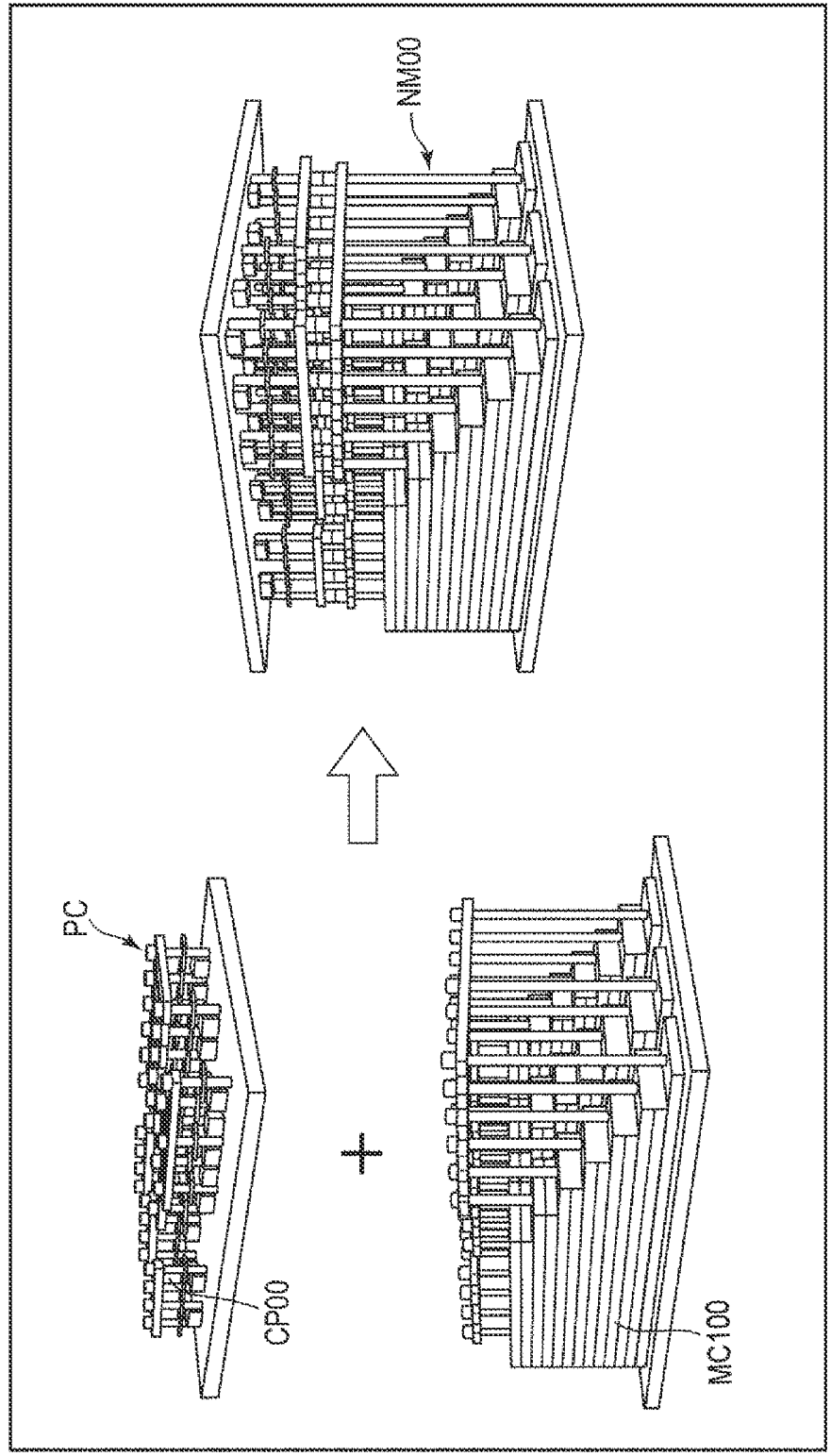
FIG. 14 is a diagram showing aspects related to a method for manufacturing a nonvolatile memory according to an embodiment.

FIG. 14 is a diagram showing an example of a method for manufacturing the nonvolatile memory NM00 according to the present embodiment.

In the present embodiment, a peripheral circuit PC includes the command processing unit CP00. The peripheral circuit PC is generated using, for example, CMOS.

The memory chip MC00 includes a NAND memory cell array. The NAND memory cell array may be a memory cell array having a three-dimensional structure.

The peripheral circuit PC and the memory chip MC00 are manufactured from separate silicon wafers. Then, the peripheral circuit PC and the memory chip MC00 are bonded together to manufacture the nonvolatile memory NM00. More specifically, the electrode of the peripheral circuit PC and the electrode of the memory chip MC00 are connected to manufacture the nonvolatile memory NM00.

The peripheral circuit manufacturing process is more advanced than the memory cell manufacturing process. When manufacturing a peripheral circuit and a memory cell from the same silicon wafer, it is necessary to match the technical level of the peripheral circuit manufacturing process with the technical level of the memory cell manufacturing process.

In contrast, in the present embodiment, the peripheral circuit PC can be designed and manufactured by using more advanced technology than the memory chip MC00, and thus the nonvolatile memory NM00 can be miniaturized, speeded up, and highly integrated.

Therefore, in the present embodiment, the peripheral circuit PC can be made more sophisticated than the case where the peripheral circuit and the memory cell are manufactured from the same silicon wafer.

Further, in the present embodiment, the storage capacity of the memory 12 and the like of the peripheral circuit PC can be increased as compared with the case where the peripheral circuit and the memory cell are manufactured from the same silicon wafer.

Further, in the present embodiment, the reuse rate of the functional block and the circuit block can be increased as compared with the case where the peripheral circuit and the memory cell are manufactured from the same silicon wafer.

In the following, an example of the effect obtained by the memory system 1 according to the present embodiment will be described by comparing the memory system 1 according to the present embodiment with a memory system of a comparative example.

Figure 15:
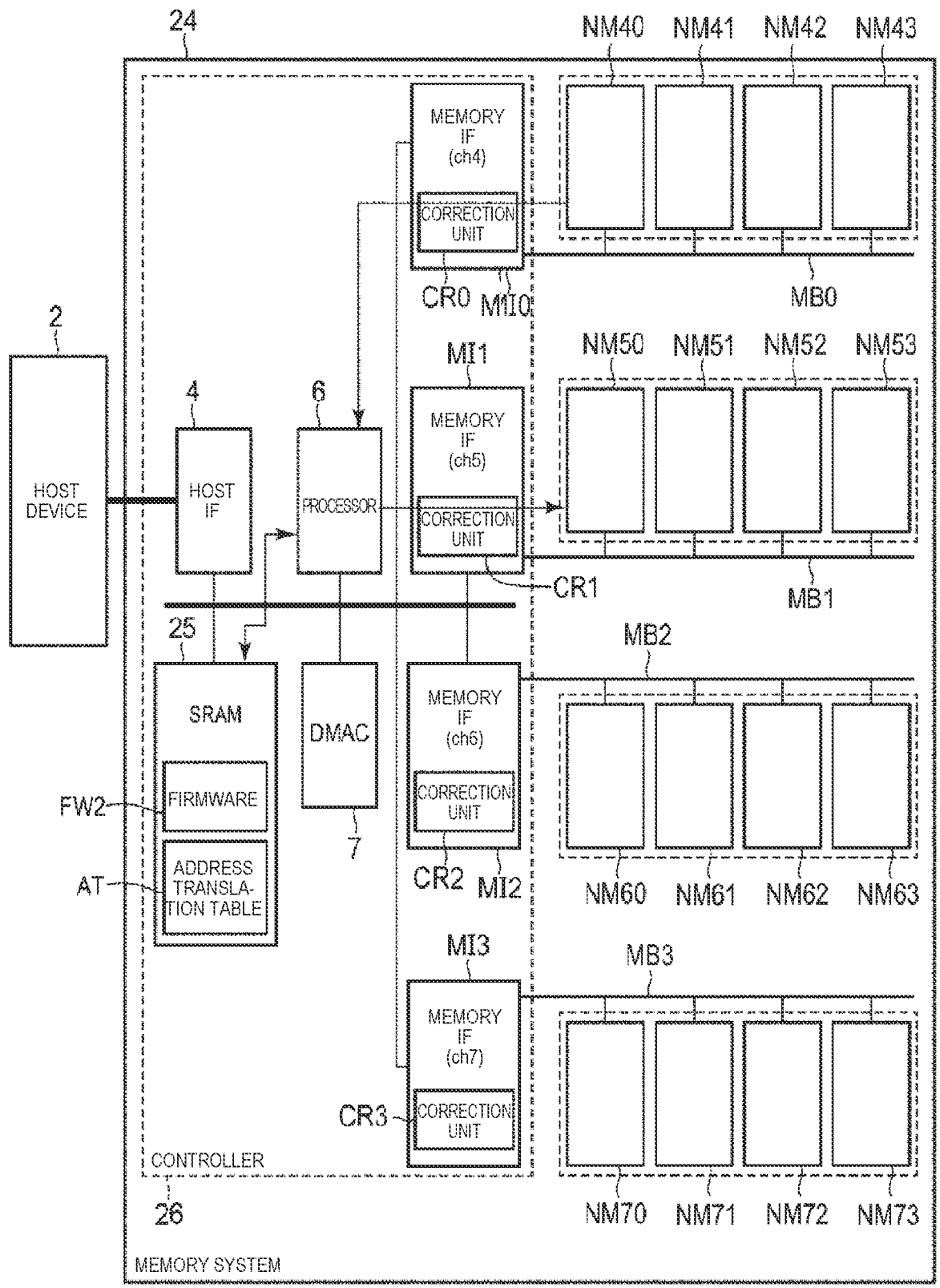
FIG. 15 is a block diagram showing an example of a configuration of a memory system of a comparative example.

FIG. 15 is a block diagram showing an example of a configuration of a memory system 24 of a comparative example.

The memory system 24 of the comparative example can communicate with the host device 2, and includes nonvolatile memories NM40 to NM73 and a controller 26.

The nonvolatile memories NM40 to NM73 are different from the nonvolatile memories NM00 to NM33 in that the command processing units CP00 to CP33 are not provided.

Each of the nonvolatile memories NM40 to NM43 is connected to the memory bus MB0. Each of the nonvolatile memories NM50 to NM53 is connected to the memory bus MB1. Each of the nonvolatile memories NM60 to NM63 is connected to the memory bus MB2. Each of the nonvolatile memories NM70 to NM73 is connected to the memory bus MB3.

The controller 26 controls the nonvolatile memories NM40 to NM73.

The controller 26 includes a host interface unit 4, a storage device such as an SRAM 25, a processor 6, a DMAC 7, and memory interface units MI0 to MI3.

The SRAM 25 stores, for example, a firmware FW2 and an address translation table AT.

The firmware FW2 is executed by the processor 6 to cause the processor 6 to achieve various controls including compaction.

The processor 6 executes the firmware FW2. The processor 6 transmits a read command and a physical address of a read destination to the nonvolatile memory NM40 including the original block via the memory interface unit MI0 and the memory bus MB0.

The processor 6 receives a frame including a data and a redundant part from the position specified by the physical address of the read destination in the nonvolatile memory NM40 via the memory bus MB0 and the memory interface unit MI0, and stores the received frame in the SRAM 25.

The processor 6 determines whether or not the frame stored in the SRAM 25 is a valid frame based on the address translation table AT, the physical address of the read destination, and the redundant part.

The processor 6 transmits a write command, a physical address of a write destination, and a valid frame stored in the SRAM 25 to the nonvolatile memory NM50 including a destination block. As a result, the valid data of the original block of the nonvolatile memory NM40 is stored in the destination block of the nonvolatile memory NM50.

Further, the processor 6 transmits an erase command for erasing the original block and a physical address of an erase destination to the nonvolatile memory NM40 including the original block via the memory interface unit MI0 and the memory bus MB0. Thereby, an erase on the original block is performed. Then, the processor 6 manages the original block as a free block.

The time required for read/write for one nonvolatile memory is longer than that for HDD. In the memory system 24 of the comparative example, by mounting a large number of nonvolatile memories NM40 to NM73, and increasing the degree of parallelism of the internal processing, high-speed read/write is achieved as compared with the HDD.

The memory system 24 of the comparative example performs compaction as described above. When the memory system 24 of the comparative example is not equipped with a DRAM, or when the size of the DRAM of the memory system 24 of the comparative example is small, the controller 26 includes, for example, the SRAM 25 for temporary storage. However, mounting the SRAM 25 having a size sufficient for compaction in the memory system 24 of the comparative example causes high cost. Therefore, it is assumed that the memory system 24 of the comparative example has a limitation on the buffer size that can be used for compaction. In the memory system 24 of the comparative example having a limitation on the buffer size, it is difficult to increase the degree of parallelism of the internal processing, and it is necessary to perform the processing little by little in series. In such a case, the processing speed of the memory system 24 of the comparative example becomes slow when viewed from the host device 2.

As shown in FIG. 15, the memory system 24 of the comparative example includes 16 nonvolatile memories NM40 to NM73, four memory buses MB0 to MB3, and four channels ch4 to ch7. In the SRAM 25 of the memory system 24 of the comparative example, it is assumed that the read buffer memory for temporarily storing the data read from any of the nonvolatile memories NM40 to NM73 in the compaction is limited to 516 kilobytes, and the write buffer memory for temporarily storing the data written to any of the nonvolatile memories NM40 to NM73 in the compaction is limited to 192 kilobytes. In this way, the memory system 24 of the comparative example in which the write buffer memory for temporarily storing the data written to any of the nonvolatile memories NM40 to NM73 in the compaction is limited to 192 kilobytes can perform a write operation of 4 [the number of nonvolatile memories]×1 [the number of planes] in parallel in the compaction. When the size of the buffer memory is sufficient in the hardware configuration of the memory system 24 of the comparative example, the memory system 24 of the comparative example can perform a write operation of 16 [the number of nonvolatile memories]×2 [the number of planes] in parallel in the compaction. Comparing the write performances of these two compactions in the memory system 24 of the comparative example, the number of chips that can be written in parallel when the size of the write buffer memory is limited is ¼ of the number of chips that can be written in parallel when the size of the write buffer memory is not limited. Further, in the memory system 24 of the comparative example, the number of planes that can be written in parallel when the size of the write buffer memory is limited is ½ of the number of planes that can be written in parallel when the size of the write buffer memory is not limited. Therefore, the compaction performance of the memory system 24 of the comparative example in which the size of the write buffer memory is limited is ⅛ of the case where the size of the write buffer memory is not limited.

As described above, when the size of the SRAM 25 is limited, the compaction of the memory system 24 of the comparative example takes time, and the write performance score (for example, random write over the entire area) of the memory system 24 of the comparative example becomes low.

In contrast, in the memory system 1 according to the present embodiment, when the command processing units CP00 to CP33 can correct errors for data and redundant parts in compaction, the controller 3 receives the redundant parts from the command processing units CP00 to CP33 but does not receive the data.

Therefore, in the memory system 1 according to the present embodiment, even if the size of the SRAM 5 is limited, the area used for compaction can be reduced, and the nonvolatile memories NM00 to NM33 can be operated in parallel. Accordingly, in the present embodiment, the compaction can be speeded up.

Figure 16:
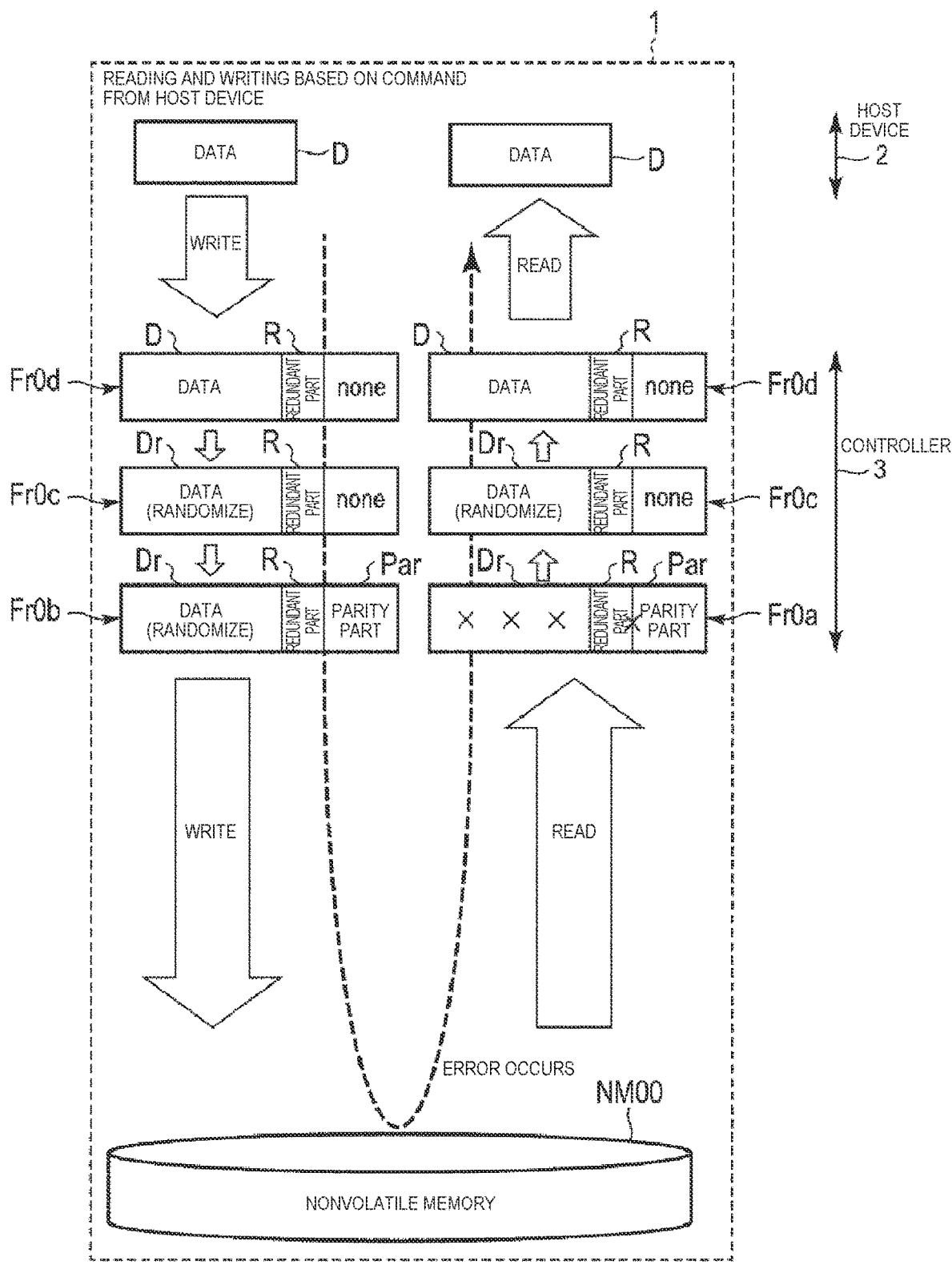
FIG. 16 is a diagram showing an example of data conversion when a memory system according to an embodiment receives a write command and a read command from a host device.

FIG. 16 is a diagram showing an example of data conversion when the memory system 1 according to the present embodiment receives a write command and a read command from the host device 2. The data conversion when the memory system 24 of the comparative example receives the write command and the read command from the host device 2 is also the same as in FIG. 16.

The controller 3 receives, for example, a write command, a logical address, and data D from the host device 2.

Upon receiving the write command, the controller 3 translates the logical address into a physical address by using the address translation table AT.

The controller 3 adds a redundant part R including the logical address to the data D to generate a frame Fr0d.

The controller 3 performs randomization on the data D of the frame Fr0d, and generates a frame Fr0c including the randomized data Dr and the redundant part R.

The controller 3 generates a frame Fr0b in which a parity part Par is added to the frame Fr0c, and writes the frame Fr0b to a position (page) indicated by the physical address in the nonvolatile memory NM00.

The controller 3 receives a read command and a logical address from, for example, the host device 2.

Upon receiving the read command, the controller 3 translates the logical address into a physical address by using the address translation table AT.

The controller 3 reads a frame Fr0a from the position (page) specified by the physical address in the nonvolatile memory NM00. An error may occur in the frame Fr0a.

The controller 3 performs an error correction process on the frame Fr0a read from the nonvolatile memory NM00, deletes the parity part Par from the frame Fr0a, and generates the frame Fr0c.

The controller 3 performs randomization release on the randomized data Dr included in the frame Fr0c, and generates the frame Fr0d including the data D and the redundant part R.

The controller 3 transmits the data D included in the frame Fr0d to the host device 2.

Figure 17:
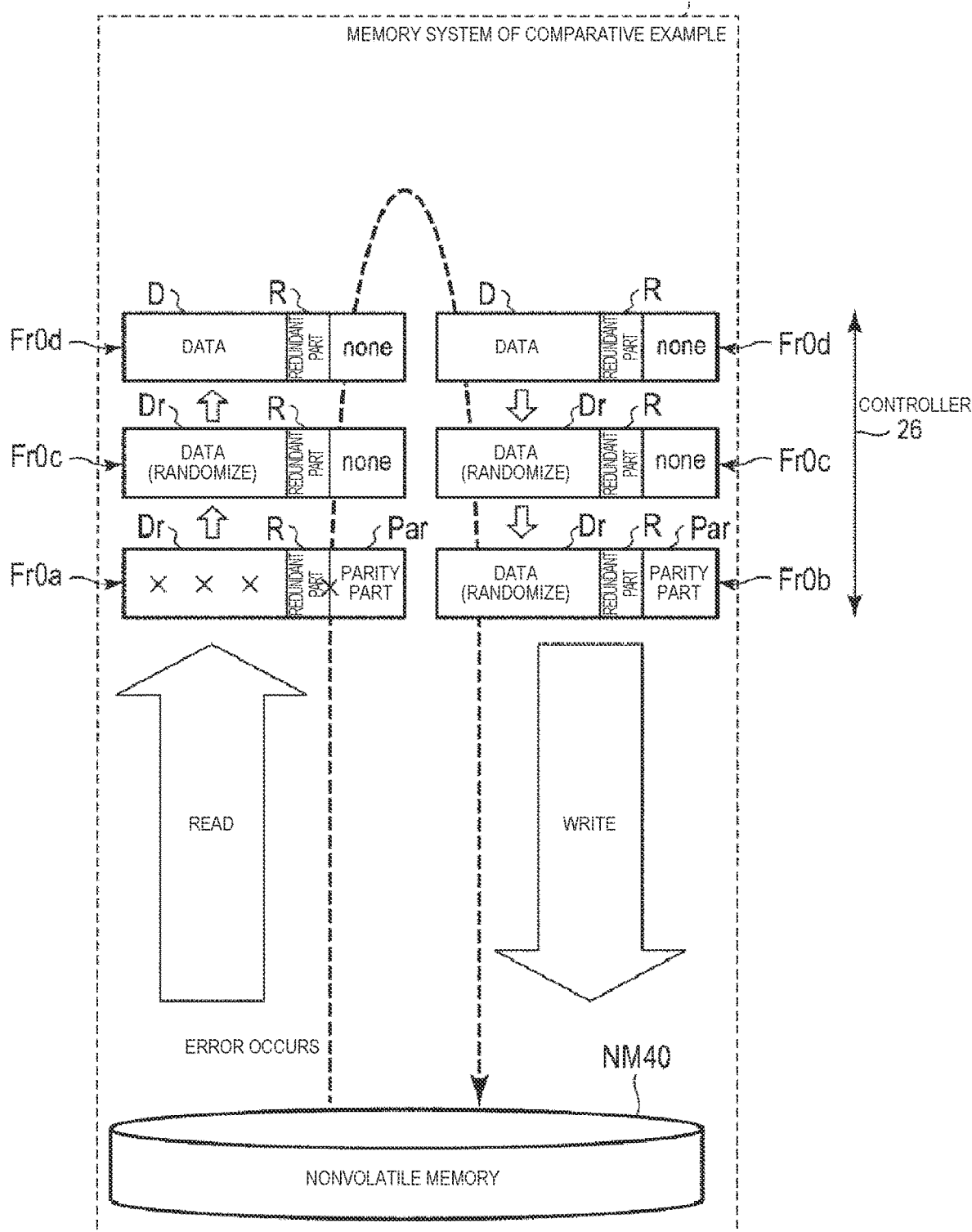
FIG. 17 is a diagram showing an example of data conversion in a compaction process performed by the memory system of the comparative example.

FIG. 17 is a diagram showing an example of data conversion in compaction performed by the memory system 24 of the comparative example. In FIG. 17, a case where the original block and the destination block are present in the nonvolatile memory NM40 is shown as an example. However, the original block and the destination block may be provided in different nonvolatile memories.

The controller 26 reads the frame Fr0a stored in the original block from the nonvolatile memory NM40. An error may occur in the frame Fr0a read from the nonvolatile memory NM40.

The controller 26 performs an error correction process on the frame Fr0a read from the nonvolatile memory NM40, deletes the parity part Par, and generates the frame Fr0c.

The controller 26 performs randomization release on the randomized data Dr included in the frame Fr0c, and generates the frame Fr0d including the randomization-released data D and the redundant part R.

The controller 26 determines whether or not the data D of the frame Fr0d is valid data based on the logical address included in the redundant part R, the physical address of the read destination, and the address translation table AT.

When the data D is valid data, the controller 26 performs randomization on the data D of the frame Fr0d, and generates the frame Fr0c including the randomized data Dr and the redundant part R.

The controller 26 adds the parity part Par to the frame Fr0c to generate the frame Fr0b.

The controller 26 writes the frame Fr0b to a position specified by the physical address of the write destination.

When the data D is valid data, the controller 26 updates the physical address corresponding to the logical address included in the redundant part R to the physical address of the write destination in the address translation table AT.

As described above, in the memory system 24 of the comparative example, the frame Fr0a including the randomized data Dr, the redundant part R, and the parity part Par is transmitted from the nonvolatile memory NM40 to the controller 26 in the compaction. Further, in the memory system 24 of the comparative example, the frame Fr0b including the randomized data Dr, the redundant part R, and the parity part Par is transmitted from the controller 26 to the nonvolatile memory NM40 in the compaction.

Figure 18:
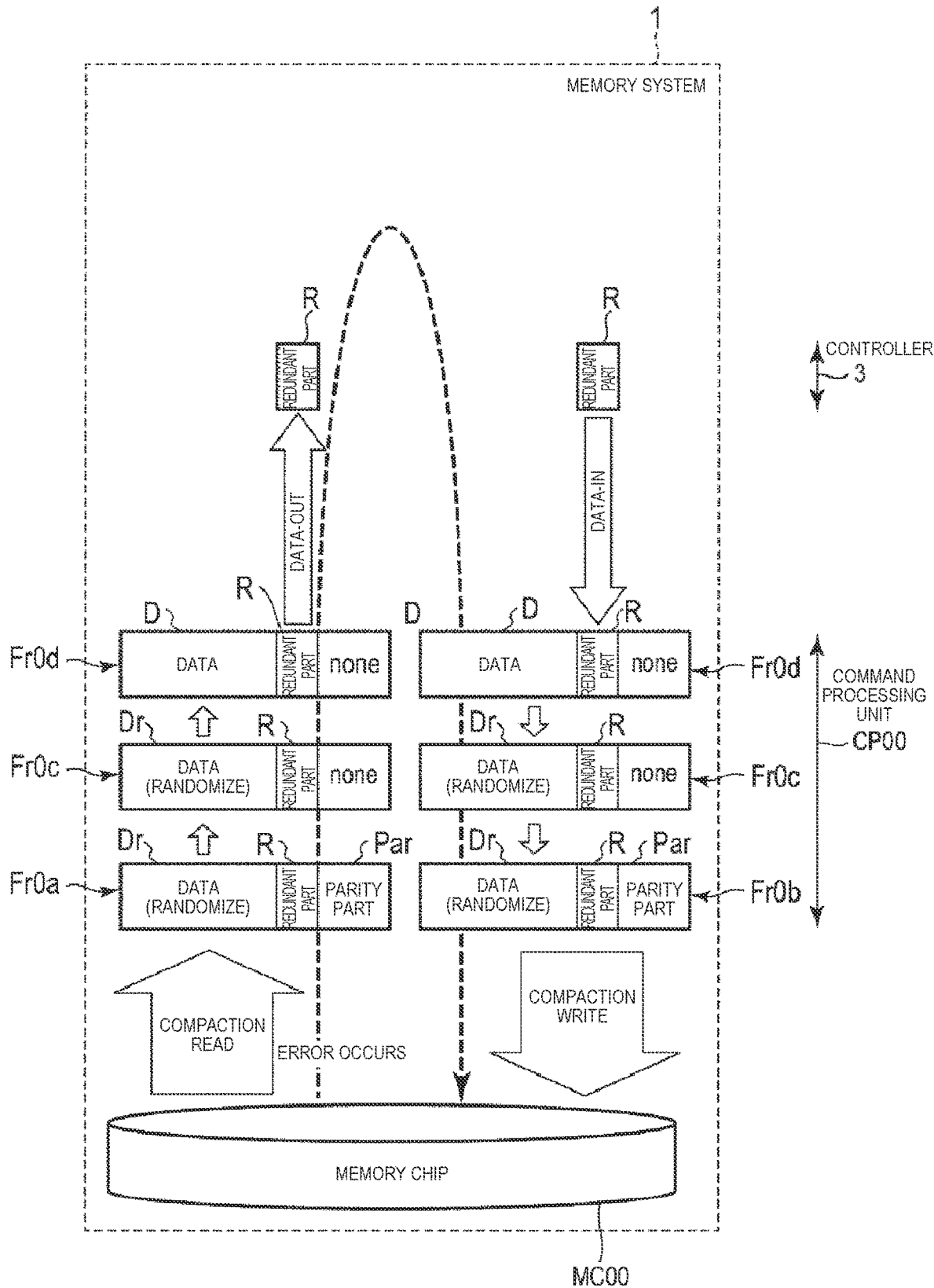
FIG. 18 is a diagram showing an example of data conversion in compaction performed by a memory system according to an embodiment.

FIG. 18 is a diagram showing an example of data conversion in compaction performed by the memory system 1 according to the present embodiment. In FIG. 18, a case where the original block and the destination block are disposed in the nonvolatile memory NM00 is shown as an example.

The controller 3 transmits the compaction read command, the physical address of the read destination, and the randomization key to the command processing unit CP00.

The command processing unit CP00 reads the frame Fr0a stored in a position specified by the physical address of the read destination in the nonvolatile memory NM00. An error may occur in the frame Fr0a read from the nonvolatile memory NM00.

The command processing unit CP00 performs an error correction process on the frame Fr0a read from the nonvolatile memory NM00, deletes the parity part Par from the frame Fr0a, and generates the frame Fr0c.

The command processing unit CP00 uses the randomization key to perform the randomization release on the randomized data Dr of the frame Fr0c, and generates the frame Fr0d including the data D and the redundant part R.

The command processing unit CP00 transmits the redundant part R of the frame Fr0d to the controller 3 (data-out).

The controller 3 determines whether or not the data D of the frame Fr0d stored in the command processing unit CP00 is valid data based on the logical address included in the redundant part R received from the command processing unit CP00, the address translation table AT, and the physical address of the read destination. For example, the controller 3 determines whether or not the logical address included in the redundant part R and the physical address of the read destination are associated with each other in the address translation table AT. Then, the controller 3 determines that the data D of the frame Fr0d is valid data when the logical address included in the redundant part R and the physical address of the read destination are associated with each other in the address translation table AT. On the contrary, the controller 3 determines that the data D of the frame Fr0d is not valid data when the logical address included in the redundant part R and the physical address of the read destination are not associated with each other in the address translation table AT.

When the controller 3 determines that the data D included in the frame Fr0d stored in the command processing unit CP00 is valid data, the controller 3 transmits the compaction write command, the physical address of the write destination, and the redundant part R to the command processing unit CP00 (data-in).

The command processing unit CP00 receives the compaction write command, the physical address of the write destination, the redundant part R, and the randomization key from the controller 3.

The command processing unit CP00 uses the randomization key to perform randomization on the data D of the frame Fr0d including the received redundant part R, and generates the frame Fr0c including the randomized data Dr and the redundant part R.

The command processing unit CP00 generates the frame Fr0b in which the parity part Par is added to the randomized data Dr and the redundant part R of the frame Fr0c.

The command processing unit CP00 writes the frame Fr0b to the position specified by the physical address of the write destination on the memory chip MC00.

When the controller 3 determines that the data D included in the frame Fr0d is valid data, the controller 3 updates the address translation table AT so that the logical address included in the redundant part R and the physical address of the write destination are associated with each other.

When the command processing unit CP00 can correct the frame error in the compaction, the command processing unit CP00 transmits the redundant part R to the controller 3 without transmitting the data D to the controller 3, and receives the redundant part R corresponding to the valid data from the controller 3.

The memory system 1 confines the movement of the frame in the nonvolatile memory NM00. When the error correction for the data D and the redundant part R is possible by the command processing unit CP00, the nonvolatile memory NM00 transmits the redundant part R to the controller 3 and does not transmit the data D to the controller 3. The data D included in the frame is secured in the command processing unit CP00. The controller 3 collects the redundant part R from the nonvolatile memory NM00. When the error correction is possible by the command processing unit CP00, the controller 3 may not provide the data D included in the frame in the SRAM 5. The controller 3 updates the relationship between the physical address and the logical address in the address translation table AT after moving the valid data from the original block to the destination block.

In the present embodiment described above, the size of the temporary storage SRAM 5 provided in the controller 3 and used in the compaction can be made smaller than the SRAM 25 of the memory system 24 of the comparative example. Specifically, the size of the SRAM 5 for temporary storage of the controller 3 can be about 1/300 or less of the size of the SRAM 25 of the controller 26.

Even when the controller 3 is not equipped with the DRAM, the memory system 1 can prevent performance deterioration due to the size limitation of the SRAM 5, and perform compaction with the maximum degree of parallelism of the number of nonvolatile memories NM00 to NM33 mounted. In other words, even when the controller 3 is not equipped with the DRAM, the memory system 1 can perform compaction with the same performance as when the controller 3 is equipped with the DRAM.

In compaction, the memory system 1 moves data from the original block to the destination block inside each of the nonvolatile memories NM00 to NM33 without transmitting the data from the command processing units CP00 to CP33 to the controller 3.

The size of the data communicated between the controller 3 of the memory system 1 and the nonvolatile memories NM00 to NM33 in the compaction is smaller than the size of the data communicated between the controller 26 of the memory system 24 of the comparative example and the nonvolatile memories NM40 to NM73 in the compaction. Accordingly, the amount of communication between the controller 3 of the memory system 1 and the nonvolatile memories NM00 to NM33 can be reduced. Therefore, in the memory system 1 according to the present embodiment, the compaction processing time can be shortened as compared with the memory system 24 of the comparative example. By shortening the compaction processing time, in the present embodiment, it is possible to prevent the random write to the nonvolatile memories NM00 to NM33 from being hindered by the compaction. Therefore, the random write performance of the memory system 1 according to the present embodiment is higher than the random write performance of the memory system 24 of the comparative example.

In compaction, the controller 3 of the memory system 1 according to the present embodiment first transmits a compaction read command to the command processing unit CP00, and then transmits a compaction write command to the command processing unit CP00. The compaction read command and the compaction write command will be described below.

First, the compaction read command will be described.

As an example of a process of determining whether the data of the original block to be compacted is valid or invalid, in the present embodiment, a process of reading all the data of the original block and determining whether the read data is valid or invalid will be described as an example.

The compaction read command is a command for extracting the redundant part R, which is validity determination information necessary for the controller 3 to determine valid data, from the command processing unit CP00 in compaction.

The command processing unit CP00 performs first to fourth compaction read operations according to the compaction read command.

The first compaction read operation is a process of reading randomized data and a redundant part from the memory chip MC00 and storing the read randomized data in the memory 12 of the command processing unit CP00.

The second compaction read operation is a process of performing an error correction process on the randomized data and the redundant part stored in the memory 12, determining whether or not the error correction is possible, and storing the error-corrected randomized data and redundant part in the memory 12.

The third compaction read operation is a process of using the randomization key received from the controller 3 to perform randomization release on the randomized data that is stored in the memory 12 and error-corrected, and storing the randomization-released data in the memory 12.

The fourth compaction read operation is a process of transmitting the redundant part R to the controller 3 when a request for data-out of the redundant part R is received from the controller 3, for example.

In the memory system 24 of the comparative example, when reading to the nonvolatile memory NM40, for example, the controller 26 transmits a read command and a physical address to the nonvolatile memory NM40. When the nonvolatile memory NM40 is a QLC, the physical address specifies any one of a lower page, a middle page, an upper page, and a top page. Therefore, the controller 26 needs to transmit four read commands to the nonvolatile memory NM40 in order to read data from the lower page/ middle page/upper page/top page.

In contrast, in the present embodiment, when the memory chip MC00 is a QLC, upon receiving the compaction read command, the command processing unit CP00 performs all 15 levels of sensing and reads data from 4 pages (lower page/middle page/upper page/top page). Therefore, in the present embodiment, the command execution speed can be improved. Further, when the nonvolatile memory NM00 is configured with two planes PL0 and PL1, the command processing unit CP00 can perform the compaction read command in parallel with the two planes PL0 and PL1.

In the present embodiment, the controller 3 determines whether the data is valid or invalid, and determines which page address in which block the data is to be moved to. The command processing unit CP00 transmits a redundant part to the controller 3 for determining whether it is valid or invalid and for determining the destination. However, when the data error correction is possible in the command processing unit CP00, the command processing unit CP00 does not transmit the data to the controller 3.

It is assumed that the controller 26 of the memory system 24 of the comparative example can output data from the nonvolatile memory NM40 to the controller 26 according to a command for data-out, for example, in 20 nanoseconds. Further, it is assumed that the memory system 24 of the comparative example requires a waiting time of, for example, 300 nanoseconds before the data can be output from the nonvolatile memory NM40 to the controller 26 according to the command for data-out. In this case, the time required for the memory system 24 of the comparative example to extract the redundant part and the data of 4 frames/page×4 pages [lower page/middle page/upper page/ top page]=16 frames from one word line is ((300 nanoseconds+20 nanoseconds)×16=) 5.12 milliseconds.

In contrast, in the memory system 1 according to the present embodiment, addresses are continuously formed in the command processing unit CP00. In this case, the time required for the memory system 1 to extract the redundant part and the data of 4 frames/page×4 pages [lower page/ middle page/upper page/top page]=16 frames from one word line is (300 nanoseconds+(20 nanoseconds×16)=) 0.64 milliseconds.

As described above, in compaction, the memory system 1 according to the present embodiment continuously generates addresses for reading from the address indicating the original block in the command processing unit CP00. Then, the command processing unit CP00 continuously reads the data based on the generated address. As a result, the memory system 1 according to the present embodiment can transfer the data at a speed of, for example, about eight times that of the memory system 24 of the comparative example.

Next, the compaction write command will be described.

The compaction write command is a command for the command processing unit CP00 to write a valid frame to the memory chip MC00 in compaction.

The command processing unit CP00 performs first to fourth compaction write operations according to the compaction write command.

The first compaction write operation is a process of receiving a redundant part including data identification information such as a logical address (location information), a randomization key, and a physical address of the write destination from the controller 3.

The second compaction write operation is a process of performing randomization so that 0 and 1 of the data are leveled by using the randomization key.

The third compaction write operation is a process of generating a parity part necessary for error correction of randomized data and a redundant part (for example, an encoding process).

The fourth compaction write operation is a process of writing data to a specified position on the memory chip MC00.

For example, when the memory chip is a TLC and the data size per page is 18,000 bytes, the amount of data transferred in the data-in of the memory system 24 of the comparative example is 18,000 bytes/page×3 pages/word line [lower page/middle page/upper page]×2 planes, which is 108,000 bytes.

In contrast, for example, when the memory chip MC00 is a TLC and the data size of the redundant part per frame is 16 bytes, the amount of data transferred in the data-in of the present embodiment is 16 [number of bytes of the redundant part/frame]×4 frames/page×3 pages/word line [lower page/middle page/upper page]×2 planes, which is 384 bytes.

Therefore, in the present embodiment, the transfer amount in the data-in can be reduced to about $1/281$ of the memory system 24 of the comparative example.

In the present embodiment, when the nonvolatile memories NM00 to NM33 are QLCs, the command processing unit CP00 may continuously transfer redundant parts corresponding to one word line, that is, 16 redundant parts (=4 frames×4 pages/word line [lower page/middle page/upper page/top page]) to the controller 3. For example, when the command processing unit CP00 transmits a 16-byte redundant part to the controller 3 according to a random data output command, it may take 300 nanoseconds. In contrast, when the command processing unit CP00 continuously transfers the redundant parts corresponding to one word line, the data can be transferred in about 20 nanoseconds. Therefore, the command processing unit CP00 continuously transfers the redundant parts corresponding to one word line to the controller 3, so that the transfer efficiency can be reduced to about 6% when the random data output command is used.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A nonvolatile memory, comprising:
  a memory cell array including a plurality of memory cells; and
  a command processing unit configured to control writing and reading to and from the memory cell array according to a command received from a controller outside of the nonvolatile memory, the command processing unit including a buffer, wherein
  the command processing unit is configured to:
    store first data based on data read from a first position of the memory cell array in the buffer in response to a first command from the controller, the first command specifying the first position of the memory cell array,
    store second data based on data read from a second position of the memory cell array in the buffer in response to a second command from the controller, the second command specifying the second position of the memory cell array,
    transmit first validity determination information for the first data and second validity determination information for the second data to the controller, the first validity determination information indicating whether or not the first data is valid, the second validity determination information indicating whether or not the second data is valid, and
    write third data based on the second data that has been stored in the buffer to a third position of the memory cell array in response to a third command from the controller, the third command specifying validity determination information corresponding to the second data.

2. The nonvolatile memory according to claim 1, wherein the command processing unit is configured to write fourth data to a fourth position of the memory cell array in response to a write command from the controller, the write command specifying the fourth data and the fourth position of the memory cell array.

3. The nonvolatile memory according to claim 1, wherein the command processing unit is configured to read the first validity determination information from the memory cell array in the buffer in response to the first command from the controller.

4. The nonvolatile memory according to claim 1, wherein the command processing unit is configured to:
  perform an error correction process on the data read from the first position,
  transmit the first validity determination information to the controller when the error correction process on the data read from the first position is successful, and
  transmit the data read from the first position and the first validity determination information to the controller when the error correction process on the data read from the first position is not successful.

5. The nonvolatile memory according to claim 1, wherein the command processing unit is configured to:
  perform a randomization release on fifth data based on data read from the first position when the first command specifies a first randomization key, the randomization release using the first randomization key, and
  generate the third data based on the second data by using a second randomization key when the third command specifies the second randomization key.

6. The nonvolatile memory according to claim 1, wherein the first validity determination information includes a first logical address,
  the first logical address is a logical address of the data read from the first position of the memory cell array,
  the second validity determination information includes a second logical address,
  the second logical address is a logical address of the data read from the second position of the memory cell array, and
  the validity identification information includes the second logical address.

7. The nonvolatile memory according to claim 1, wherein the writing of the third data to the third position of the memory cell array in response to the third command includes:
  moving the second data stored in a first area of the buffer to a second area of the buffer in response to a fourth command specifying the validity identification information; and
  writing the third data based on the moved second data to the second area to the third position of the memory cell array.

8. The nonvolatile memory according to claim 1, further comprising:

a memory chip; and
a peripheral circuit, wherein
the memory cell array is in the memory chip,
the command processing unit is in the peripheral circuit, and
the peripheral circuit is bonded to the memory chip.

9. The nonvolatile memory according to claim 1, further comprising:
a memory chip including the memory cell array, wherein
the command processing unit is bonded to the memory chip.

10. A memory system, comprising:
a nonvolatile memory according to claim 1; and
a controller, wherein
the controller is configured to:
send the first command and the second command to the nonvolatile memory,
receive the first validity determination information and the second validity determination information,
determine whether or not the first data is valid based on the first validity determination information,
determine whether or not the second data is valid based on the second validity determination information, and
send the third command specifying the validity determination information to the nonvolatile memory when the first data is determined not valid and the second data is determined valid.

11. A method of controlling a nonvolatile memory including a memory cell array and a buffer, the memory cell array including a plurality of memory cells, the method comprising:
receiving a first command;
storing first data based on data read from a first position of the memory cell array in the buffer in response to the first command, the first command specifying the first position of the memory cell array;
receiving a second command;
storing second data based on data read from a second position of the memory cell array in the buffer in response to the second command, the second command specifying the second position of the memory cell array;
transmitting first validity determination information for the first data and second validity determination information for the second data to a controller, the first validity determination information indicating whether or not the first data is valid, the second validity determination information indicating whether or not the second data is valid;
receiving a third command; and
writing third data based on the second data stored in the buffer to a third position of the memory cell array in response to the third command, the third command specifying validity determination information corresponding to the second data.

12. The method according to claim 11, further comprising:
receiving a write command; and
writing fourth data to a fourth position of the memory cell array in response to the write command, the write command specifying the fourth data and the fourth position of the memory cell array.

13. The method according to claim 11, further comprising:
reading the first validity determination information from the memory cell array in response to the first command.

14. The method according to claim 13, further comprising:
storing the first validity determination read from the memory cell array in the buffer.

15. The method according to claim 11, further comprising:
performing an error correction process on the data read from the first position;
transmitting the first validity determination information when the error correction process on the data read from the first position is successful; and
transmitting the data read from the first position and the first validity determination information when the error correction process on the data read from the first position is not successful.

16. The method according to claim 11, further comprising:
performing a randomization release on fifth data based on data read from the first position when the first command specifies a first randomization key, the randomization release using the first randomization key; and
generating the third data based on the second data by using a second randomization key when the third command specifies the second randomization key.

17. The method according to claim 11, wherein
the first validity determination information includes a first logical address,
the first logical address is a logical address of the data read from the first position of the memory cell array,
the second validity determination information includes a second logical address,
the second logical address is a logical address of the data read from the second position of the memory cell array, and
the validity identification information includes the second logical address.

18. The method according to claim 11, further comprising:
receiving a fourth command specifying the validity identification information, wherein
the third command specifies the third position, and
the writing of the third data to the third position of the memory cell array includes:
moving the second data stored in a first area of the buffer to a second area of the buffer in response to the fourth command; and
writing the third data based on the moved second data to the second area to the third position of the memory cell array.

* * * * *